(12) United States Patent
Lee

(10) Patent No.: US 11,442,554 B2
(45) Date of Patent: Sep. 13, 2022

(54) ELECTRONIC DEVICE AND METHOD FOR RECOMMENDING WORD IN SAME

(71) Applicant: SAMSUNG ELECTRONICS CO., LTD., Suwon-si (KR)

(72) Inventor: Seungyup Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/785,988

(22) Filed: Feb. 10, 2020

(65) Prior Publication Data

US 2020/0257377 A1 Aug. 13, 2020

(30) Foreign Application Priority Data

Feb. 11, 2019 (KR) .................. 10-2019-0015704

(51) Int. Cl.
*G06F 3/027* (2006.01)
*G06F 3/023* (2006.01)
(Continued)

(52) U.S. Cl.
CPC ........ *G06F 3/0237* (2013.01); *G06F 3/04886* (2013.01); *G06F 40/274* (2020.01)

(58) Field of Classification Search
CPC ... G06F 3/0237; G06F 40/274; G06F 3/04886
See application file for complete search history.

(56) References Cited

U.S. PATENT DOCUMENTS 8,818,794 B2  8/2014  Archer et al.
8,965,754 B2  2/2015  Jones et al.
(Continued)

FOREIGN PATENT DOCUMENTS

JP  2015-185023 A  10/2015
KR  10-2014-0090464  7/2014
(Continued)

OTHER PUBLICATIONS

International Search Report and Written Opinion dated May 29, 2020 in counterpart International Patent Application No. PCT/KR2020/001768.

*Primary Examiner* — Sahlu Okebato
(74) *Attorney, Agent, or Firm* — Nixon & Vanderhye P.C.

(57) ABSTRACT

An electronic device according to various embodiments includes: a display; a communication circuit configured to perform communication with at least one of at least one external server and/or at least one external electronic device; a processor operatively connected to the display and the communication circuit; and a memory operatively connected to the processor. The memory stores instructions which, when executed, cause the processor to control the electronic device to: display a user interface including a virtual keyboard through the display; display a string including at least one word on the user interface based at least in part on an input to the virtual keyboard; determine at least one recommended word associated with the string based at least in part on a language model; and display the determined at least one recommended word on the user interface. The language model may include a language model of the electronic device, and a language model that is received from the external server or the external electronic device based on state information of the external electronic device that is connected for communication through the communication circuit.

12 Claims, 16 Drawing Sheets

(51) Int. Cl.
    *G06F 40/274*   (2020.01)
    *G06F 3/04886*  (2022.01)

(56) References Cited

U.S. PATENT DOCUMENTS

| | | |
|---|---|---|
| 9,424,246 B2 | 8/2016 | Spencer et al. |
| 2006/0230350 A1* | 10/2006 | Baluja ................... G06F 16/334 |
| | | 715/700 |
| 2015/0331605 A1 | 11/2015 | Park et al. |
| 2017/0249017 A1* | 8/2017 | Ryu ........................ G06F 3/018 |
| 2018/0225274 A1 | 8/2018 | Tommy et al. |
| 2020/0363949 A1* | 11/2020 | Gnedin ................... H04L 67/20 |

FOREIGN PATENT DOCUMENTS

| | | |
|---|---|---|
| KR | 10-2018-0021316 | 3/2018 |
| KR | 10-2018-0042577 | 4/2018 |

* cited by examiner

ELECTRONIC DEVICE AND METHOD FOR RECOMMENDING WORD IN SAME

CROSS-REFERENCE TO RELATED APPLICATION

This application is based on and claims priority under 35 U.S.C. § 119 to Korean Patent Application No. 10-2019-0015704, filed on Feb. 11, 2019, in the Korean Intellectual Property Office, the disclosure of which is incorporated by reference herein in its entirety.

BACKGROUND

1) Field

The disclosure relates to an electronic device and a method of recommending a word in the same.

2) Description of Related Art

Electronic devices may acquire at least one piece of information associated with a user using an input/output interface (e.g., a virtual keyboard displayed on a display). For example, when a user holds a conversation through a messenger, inputs an address of a web site, inputs personal identification information using a banking service, or takes notes on arbitrary information, the user can input words using the virtual keyboard displayed on the display of the electronic device, and the electronic device can acquire at least one piece of information associated with the user based on the words.

In a case where the words are input through the virtual keyboard, the electronic device may determine at least one recommended word associated with the words input through the virtual keyboard using a language model of the electronic device, and may provide the determined recommended word. However, the recommended word provided through the language model of the electronic device has limits in recommending a word suitable to a user because an usage environment of a user is not considered. Therefore, a solution for recommending a word more suitable to a user may be required.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device, and a method of recommending a word more suitable to a user in the same by determining and providing a recommended word in consideration of an usage environment of the user.

Embodiments of the disclosure provide an electronic device, and a method of recommending a word more suitable to a user in the same by determining a recommended word suitable to a user using a language model of an electronic device and a language model corresponding to state information of an external electronic device (or a plurality of external electronic devices).

In accordance with various example embodiments, an electronic device includes: a display; a communication circuit configured to perform communication with at least one of at least one external server and/or at least one external electronic device; a processor operatively connected to the display and the communication circuit; and a memory operatively connected to the processor. The memory stores instructions which, when executed, cause the processor to control the electronic device to: display a user interface including a virtual keyboard through the display; display a string including at least one word on the user interface based on at least partly an input to the virtual keyboard; to determine at least one recommended word associated with the string based at least in part on a language model; and display the determined at least one recommended word on the user interface. The language model includes a language model of the electronic device, and a language model that is received from the external server or the external electronic device based on state information of the external electronic device that is connected for communication through the communication circuit.

In accordance with various example embodiments, a method of recommending a word in an electronic device includes: displaying a user interface including a virtual keyboard; displaying a string including at least one word on the user interface based at least in part on an input to the virtual keyboard; determining at least one recommended word associated with the string based on a language model; and displaying the at least one recommended word on the user interface. The language model includes a language model of the electronic device, and a language model received from an external server or an external electronic device connected for communication with the electronic device based on state information of the external electronic device.

The electronic device according to various example embodiments and the method of recommending a word in the electronic device can provide a recommended word more suitable to a user by determining and providing the recommended word in consideration of a usage environment of the user.

The electronic device according to various example embodiments and the method of recommending a word in the electronic device can provide a recommended word more suitable to a user by determining a recommended word suitable to the user using both a language model of the electronic device and a language model corresponding to state information of an external electronic device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
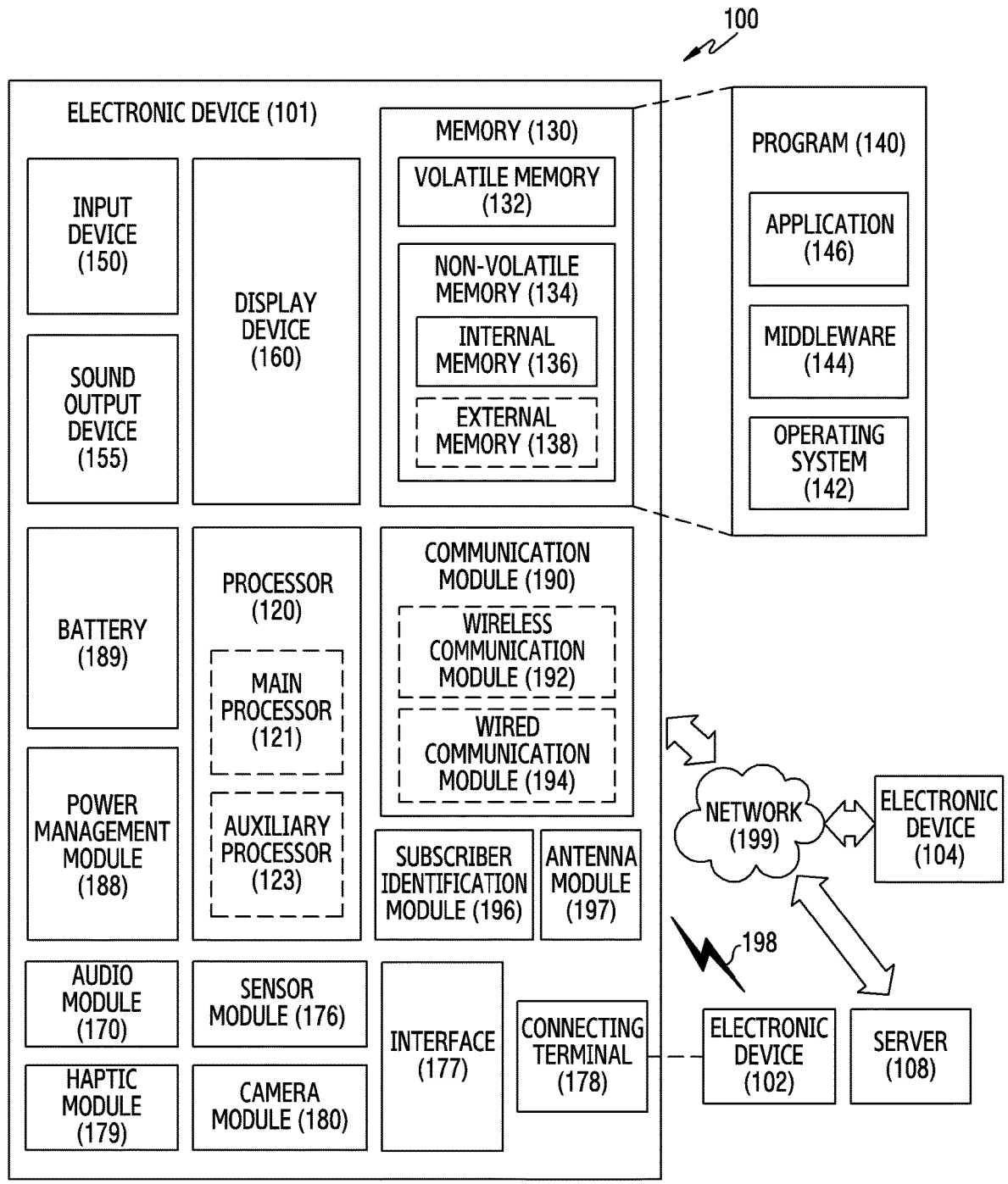
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
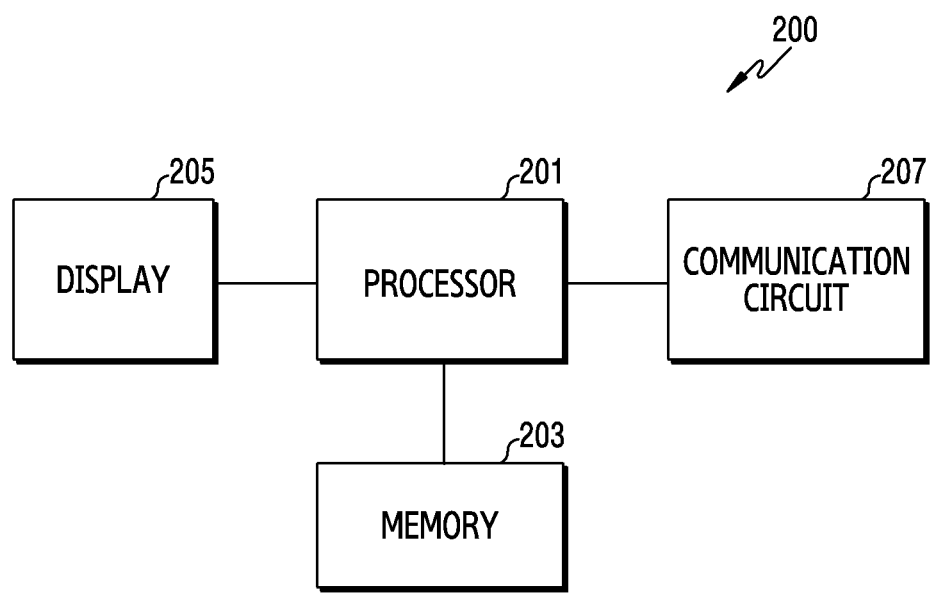
FIG. 2 is a block diagram illustrating an example electronic device according to various embodiments.

FIG. 2 is a block diagram illustrating an example electronic device according to various embodiments.

Referring to FIG. 2, an electronic device 200 (e.g., the electronic device 101 of FIG. 1) may include at least one of a processor (e.g., including processing circuitry) 201 (e.g., the processor 120 of FIG. 1), a memory 203 (e.g., the memory 130 of FIG. 1), a display 205 (e.g., the display 160 of FIG. 1), and a communication circuit 207 (e.g., the communication module 190 of FIG. 1), but it may not limited thereto.

The processor 201 may include various processing circuitry and control overall operations of the electronic device 200. To control overall operations of the electronic device 200, the processor 201 may be operatively or electrically connected to the other components such as the memory 203, the display 205, and/or the communication circuit 207.

The processor 201 may receive commands of the other components, analyze the received commands, and perform calculation or process data according to the analyzed commands. For example, the processor 201 may request instructions, data, or signals from the memory 203. The processor 201 may record (or store) or update instructions, data, or signals in the memory 203 to control the electronic device 200 or to control the other components inside the electronic device 200.

The processor 201 may analyze and process messages, data, instructions, or signals received from the memory 203, the display 205, or the communication circuit 207. The processor 201 may generate new messages, data, instructions, or signals based on the received messages, data, instructions, or signals. The processor 201 may provide the processed or generated messages, data, instructions, or signals for the memory 203, the display 205, or the communication circuit 207.

The memory 203 may store instructions, control instruction codes, control information, or user data that control the electronic device 200. For example, the memory 203 may store one or more of an application, an operating system, middleware, or a device driver.

The display 205 may visually provide information for the outside of the electronic device 200. According to an example embodiment, the display 205 may include a touch circuitry configured to sense a touch, or a sensor circuit (e.g., a pressure sensor) configured to measure an intensity of a force generated by the touch.

The communication circuit 207 may be used to establish a communication path between the electronic device 200 and another electronic device (e.g., the electronic device 102 or 104 of FIG. 1 or the server 108 of FIG. 1). For example, the communication circuit 207 may be a module for at least one of a Bluetooth communication technique, a Bluetooth low energy (BLE) communication technique, a wireless fidelity (Wi-Fi) communication technique, a cellular (or mobile) communication technique, and a wired communication technique. The communication circuit 207 may provide signals, data, or messages, which are received from another electronic device, for the processor 201. The communication circuit 207 may transmit the signals, data, or messages provided from the processor 201 to another electronic device.

According to various embodiments, the processor 201 may display a user interface that includes a virtual keyboard through the display 205. For example, in a case where an application providing (or supporting) a virtual keyboard, such as a message application, an SNS application, or an intelligent application (e.g., a Bixby), is executed, the processor 201 may display a user interface that includes a virtual keyboard through the display 205. According to an example embodiment, the user interface may further include a text input region in which strings corresponding to a user input are displayed, and a recommended word display region in which at least one recommended word associated with the string is displayed, in addition to the virtual keyboard.

According to various embodiments, in a case where a user input to the virtual keyboard included in the user interface is received, the processor 201 may display the string corresponding to the user input in the text input region of the user interface.

According to various embodiments, in a case where a string including one word is displayed in the text input region of the user interface (or in a case where a string including one word is input through the virtual keyboard), the processor 201 may determine at least one recommended word associated with the string based on a language model. For example, in a case where there is a language model received from an external electronic device (e.g., the electronic device 102 or 104 of FIG. 1 or the server 108 of FIG. 1), the processor 201 may determine at least one recommended word associated with a string using the language model of the electronic device and the language model received from the external electronic device. As another example, in the case where there is not a language model received from the external electronic device, the processor 201 may determine at least one recommended word associated with a string using the language model of the electronic device.

According to an example embodiment, the processor 201 may determine recommended words within a preset number (e.g., a maximum number of recommended words that can be displayed in the recommended word display region of the user interface). In a case where at least one recommended word associated with a string is determined, the processor 201 may display the determined at least one recommended word in the recommended word display region of the user interface.

According to an example embodiment, the processor 201 determines at least one first recommended word associated with a string from the language model of the electronic device, and determines at least one second recommended word associated with a string from the language model received from the external electronic device, and thereby can determine at least one recommended word associated with a string.

According to an example embodiment, without dividing the language model of the electronic device and the language model received from the external electronic device to determine the recommended words, the processor 201 may determine the at least one recommended word associated with the string from the two language models.

According to various embodiments, the processor 201 may determine at least one recommended word in the order in which a probability to be used after the string corresponding to the user input is high among a plurality of recommended words included in the language model. According to various embodiments, the processor 201 may determine at least one recommended word using an artificial neural network model for which the language model is used.

According to various embodiments, the processor 201 may receive state information of an external electronic device (e.g., the electronic device 102 of FIG. 1), which is connected for communication with the electronic device 200 through the communication circuit 207, from the external electronic device. The state information of the external electronic device may include, for instance, at least one of information associated with a name of the external electronic device (e.g., model information or information about a name of the external electronic device set by a user), information associated with an operation state of the external electronic device (e.g., operation mode information), information associated with content provided by the external electronic device (e.g., information about at least one of an image or picture displayed on a screen, or a sound, or information about an application that is in execution), and information about a point in time when the user input is finally received. According to an example embodiment, the processor 201 requests the state information of the external electronic device from the external electronic device through the communication circuit 207 at a point in time when the user interface including the virtual keyboard is displayed, and thereby may receive the state information of the external electronic device. According to an example embodiment, the processor 201 requests the state information of the external electronic device from the external electronic device through the communication circuit 207 at appointed periods, and thereby may receive the state information of the external electronic device. According to an example embodiment, in a case where the state information of the external electronic device or the content provided by the external electronic device is changed, the processor 201 may receive the state information of the external electronic device from the external electronic device through the communication circuit 207.

According to various embodiments, in a case where the state information of the external electronic device is received, the processor 201 may acquire a language model corresponding to the state information of the external electronic device. For example, the processor 201 may transmit a signal, which requests the language model corresponding to the state information of the external electronic device, to a language model server (e.g., the server 108 of FIG. 1) through the communication circuit 207, and may acquire the language model corresponding to the state information of the external electronic device based on a response signal received from the language model server. As another example, the processor 201 may transmit a signal, which requests the language model corresponding to the state information of the external electronic device, to the external electronic device through the communication circuit 207, and may acquire the language model corresponding to the state information of the external electronic device based on a response signal received from the external electronic device.

According to various embodiments, in a case where one of the recommended words displayed in the recommended word display region of the user interface is selected, the processor 201 may impart a weight to the language model of the electronic device or the language model corresponding to the state information of the external electronic device based on the selected recommended word. For example, in a case where a user input for selecting the recommended word determined from the language model of the electronic device is received, the processor 201 may increase the weight of the language model of the electronic device. As another example, in a case where a user input for selecting the recommended word determined from the language model corresponding to the state information of the external electronic device is received, the processor 201 may increase the weight of the language model corresponding to the state information of the external electronic device. According to an example embodiment, in a case where the weight of the language model of the electronic device is higher than the weight of the language model corresponding to the state information of the external electronic device, the processor 201 may increase the number of recommended words determined based on the language model of the electronic device from a first reference number, and may reduce the number of recommended words determined based on the language model corresponding to the state information of the external electronic device from a second reference number such that the recommended words determined from the language model of the electronic device can be displayed more than those determined from the language model corresponding to the state information of the external electronic device. According to an example embodiment, in a case where the weight of the language model corresponding to the state information of the external electronic device is higher than the weight of the language model of the electronic device, the processor 201 may increase the number of recommended words determined based on the language model corresponding to the state information of the external electronic device from the first reference number, and may reduce the number of recommended words determined based on the language model of the electronic device from the second reference number such that the recommended words determined from the language model corresponding to the state information of the external electronic device can be displayed more than those determined from the language model of the electronic device. According to an example embodiment, the first reference number and the second reference number may be set to values that are equal to or different from each other. According to an example embodiment, the sum of the first reference number and the second reference number may not exceed a maximum number of the recommended words that may be displayed in the recommended word display region included in the user interface.

According to various embodiments, in a case where the electronic device 200 is connected for communication with an external electronic device (e.g., the electronic device 102 or 104 of FIG. 1), the processor 201 may transmit the state information of the electronic device 200 to the external electronic device through the communication circuit 207. For example, the processor 201 may transmit information about at least one associated with information of a name of the electronic device 200 (e.g., model information or information about a name of the electronic device which is set by a user), information associated with an operation state of the electronic device 200 (e.g., operation mode information), and information associated with content provided by the electronic device (e.g., information about at least one of an image or picture displayed on a screen, or a sound, or information about an application that is in execution) to the external electronic device through the communication circuit 207. According to an example embodiment, while connection for communication with the external electronic device is established, in a case where a signal for requesting the state information of the electronic device 200 is received from the external electronic device, the processor 201 may transmit the state information of the electronic device 200 to the external electronic device through the communication circuit 207 in response to the reception. According to an example embodiment, while connection for communication with the external electronic device is established, the processor 201 may transmit the state information of the electronic device 200 to the external electronic device through the communication circuit 207 at appointed periods. According to an example embodiment, while connection for communication with the external electronic device is established, in a case where the processor 201 identifies that an operation state of the electronic device 200 or content provided by the electronic device 200 is changed, the processor 201 may transmit the state information of the electronic device 200 to the external electronic device through the communication circuit 207.

According to various embodiments, while connection for communication between the electronic device 200 and the external electronic device (e.g., the electronic device 102 or 104 of FIG. 1) is established, in a case where a signal for requesting the language model corresponding to the state information of the electronic device 200 is received from the external electronic device, the processor 201 may identify the language model corresponding to the state information of the electronic device 200 among the language models of the electronic device 200, and may transmit the identified language model to the external electronic device through the communication circuit 207.

Figure 3:
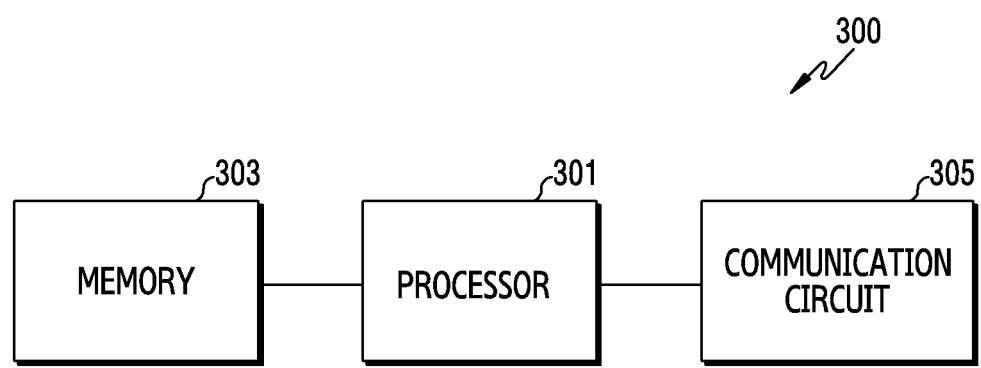
FIG. 3 is a block diagram illustrating an example server according to various embodiments.

FIG. 3 is a block diagram illustrating an example server according to various embodiments.

Referring to FIG. 3, a server 300 (e.g., the server 108 of FIG. 1) may include at least one of a processor (e.g., including processing circuitry) 301, a memory 303, and a communication circuit 305, but it may not limited thereto.

The processor 301 may include various processing circuitry and control overall operations of the server 300. To control overall operations of the server 300, the processor 301 may be operatively or electrically connected to the other components such as the memory 303 or the communication circuit 305.

The processor 301 may receive commands of the other components, analyze the received commands, and perform calculation or process data according to the analyzed commands. For example, the processor 301 may request instructions, data, or signals from the memory 303. The processor 301 may record (or store) or update instructions, data, or signals in the memory 303 to control the server 300 or to control the other components inside the server 300.

The processor 301 may analyze and process messages, data, instructions, or signals received from the memory 303 or the communication circuit 305. The processor 301 may generate new messages, data, instructions, or signals based on the received messages, data, instructions, or signals. The processor 301 may provide the processed or generated messages, data, instructions, or signals for the memory 303 or the communication circuit 305.

The memory 303 may store instructions, control instruction codes, control information, or user data that control the server 300. For example, the memory 303 may store one or more of an application, an operating system, middleware, or a device driver.

The communication circuit 305 may be used to establish a communication path between the electronic device 200 and another electronic device (e.g., the electronic device 101 of FIG. 1 or the electronic device 200 of FIG. 2). For example, the communication circuit 305 may be a module for at least one of a Bluetooth communication technique, a Bluetooth low energy (BLE) communication technique, a wireless fidelity (Wi-Fi) communication technique, a cellular (or mobile) communication technique, and a wired communication technique. The communication circuit 305 may provide signals, data, or messages, which are received from another electronic device, for the processor 301. The communication circuit 305 may transmit the signals, data, or messages provided from the processor 301 to another electronic device.

According to various embodiments, if a signal for requesting content is received from an external electronic device (e.g., the electronic device 101 of FIG. 1 or the electronic device 200 of FIG. 2) that is connected for communication with the server 300, the processor 301 may transmit content corresponding to the request to the external electronic device through the communication circuit 305. For example, if a signal for requesting content, such as an image, a sound, or a picture, which can be output from the external electronic device is received from an external electronic device, the processor 301 may transmit the content requested by the external electronic device to the external electronic device through the communication circuit 305.

According to various embodiments, in a case where a signal for requesting a language model is received from an external electronic device (e.g., the electronic device 101 of FIG. 1 or the electronic device 200 of FIG. 2), the processor 301 may identify a language model corresponding to the requested signal, and may transmit the identified language model to the external electronic device through the communication circuit 305.

An electronic device (e.g., the electronic device 101 of FIG. 1 or the electronic device 200 of FIG. 2) according to various example embodiments may include a display (e.g., the display 160 of FIG. 1 or the display 205 of FIG. 2), a communication circuit (e.g., the communication module 190 of FIG. 1 or the communication circuit 207 of FIG. 2) configured to perform communication with at least one external server and/or external electronic device, a processor (e.g., the processor 120 of FIG. 1 or the processor 201 of FIG. 2) that is operatively connected to the display and the communication circuit, and a memory (e.g., the memory 130 of FIG. 1 or the memory 203 of FIG. 2) that is operatively connected to the processor. The memory may store instructions which, when executed, cause the processor to control the electronic device to: display a user interface including a virtual keyboard through the display; display a string including at least one word on the user interface based at least in part an input to the virtual keyboard; determine at least one recommended word associated with the string based at least in part a language model; and display the determined at least one recommended word on the user interface. The language model may include a language model of the electronic device, and a language model that is received from the server or the external electronic device based on state information of the external electronic device that is connected for communication through the communication circuit.

According to various example embodiments, the instructions, when executed, may cause the processor to control the electronic device to establish the connection for communication with the external electronic device through the communication circuit, and to receive the state information of the external electronic device from the external electronic device through the communication circuit.

According to various example embodiments, the instructions, when executed, may cause the processor to control the electronic device to: transmit a signal for requesting the language model corresponding to the state information of the external electronic device to the server or the external electronic device through the communication circuit based at least in part on the received state information of the external electronic device, and receive the language model corresponding to the state information of the external electronic device from the server or the external electronic device through the communication circuit.

According to various example embodiments, the instructions, when executed, may cause the processor to control the electronic device to: transmit a signal for requesting the language model corresponding to the state information of the external electronic device to the server or the external electronic device through the communication circuit in response to the user interface including the virtual keyboard being displayed, and receive the language model corresponding to the state information of the external electronic device from the server or the external electronic device through the communication circuit.

According to various example embodiments, the instructions, when executed, may cause the processor to control the electronic device to: transmit a signal for requesting the language model corresponding to the state information of the external electronic device to the server or the external electronic device through the communication circuit in response to the state information of the external electronic device being received from the external electronic device, and receive the language model corresponding to the state information of the external electronic device from the server or the external electronic device through the communication circuit.

According to various example embodiments, the state information of the external electronic device may include at least one of information associated with a name of the external electronic device, information associated with an operation state of the external electronic device, information associated with content provided by the external electronic device, or information about a point in time when a user input is finally received.

According to various example embodiments, the instructions, when executed, may cause the processor to control the electronic device to: receive a plurality of pieces of state information from the plurality of external electronic devices through the communication circuit in a state in which the connection for communication between the electronic device and a plurality of external electronic devices is established, determine the external electronic device among the plurality of external electronic devices based at least in part on the information about a point in time at which the user input included in the state information is received; transmit a signal for requesting the state information of the external electronic device to the server or the external electronic device through the communication circuit; and receive a language model corresponding to the state information of the external electronic device from the server or the external electronic device through the communication circuit.

According to various example embodiments, the instructions, when executed, may cause the processor control the electronic device to: receive signals including a plurality of pieces of state information from the plurality of external electronic devices through the communication circuit in a state in which the connection for communication between the electronic device and a plurality of external electronic devices is established, determine the external electronic device among the plurality of external electronic devices based at least in part on intensities of the signals of the external electronic devices; transmit a signal for requesting the state information of the external electronic device to the server or the external electronic device through the communication circuit; and receive a language model corresponding to the state information of the single external electronic device from the server or the external electronic device through the communication circuit.

According to various example embodiments, the instructions, when executed, may cause the processor to control the electronic device to determine at least one first recommended word associated with the string based on the language model of the electronic device, and to determine at least one second recommended word associated with the string based on the language model received from the external electronic device.

According to various example embodiments, the instructions, when executed, may cause the processor to control the electronic device to determine at least one recommended word associated with the string based on the language model of the electronic device and the language model received from the external electronic device.

Figure 4:
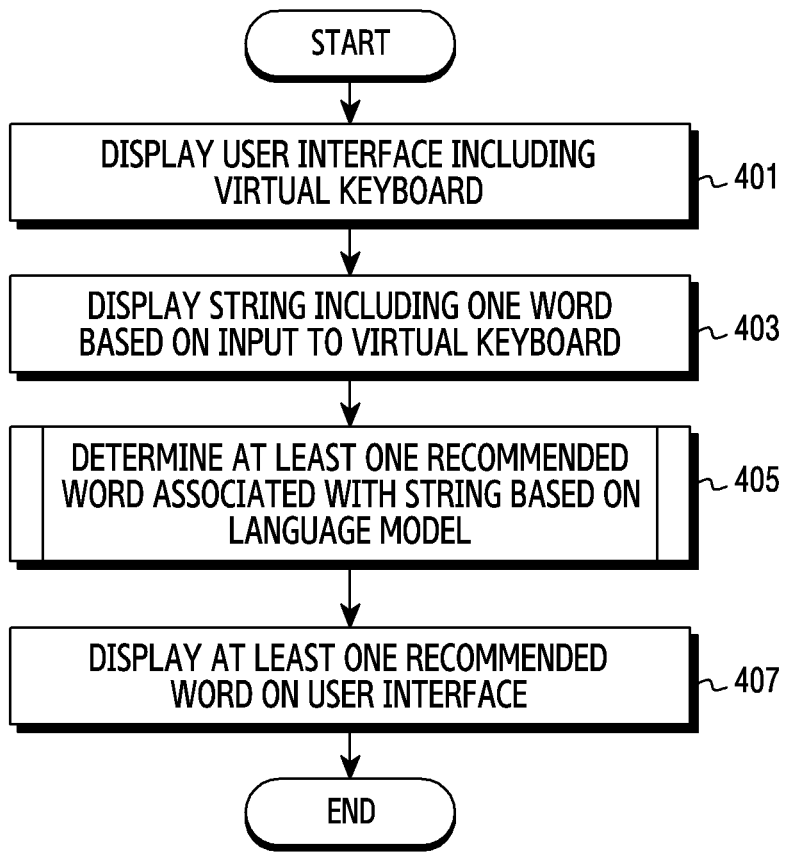
FIG. 4 is a flowchart illustrating an example method of recommending a word in the electronic device according to various embodiments.
Figure 5:
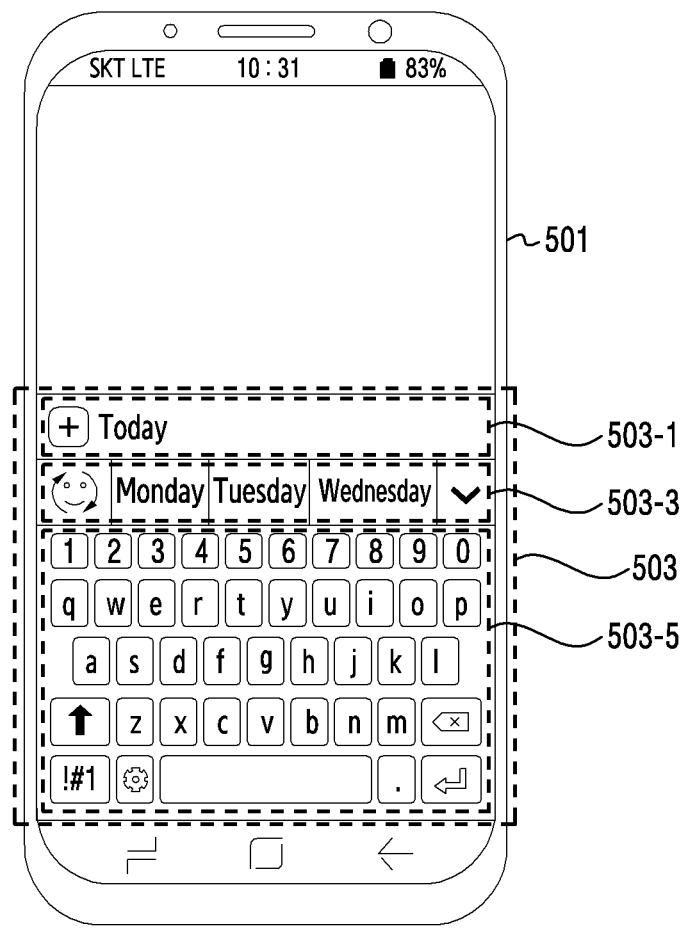
FIG. 5 is diagram illustrating an example user interface including a virtual keyboard of the electronic device according to various embodiments.

FIG. 4 is a flowchart illustrating an example method of recommending a word in an electronic device according to various embodiments. FIG. 5 is an diagram illustrating an example user interface including a virtual keyboard in an electronic device according to various embodiments.

Referring to FIGS. 4 and 5, in process 401, a processor (e.g., the processor 120 of FIG. 1 or the processor 201 of FIG. 2) of an electronic device (e.g., the electronic device 101 of FIG. 1 or the electronic device 200 of FIG. 2) may display a user interface including a virtual keyboard through a display (e.g., the display 160 of FIG. 1 or the display 205 of FIG. 2). For example, in a case where an application (e.g., a message application, an SNS application, or an intelligent application) providing (or supporting) the virtual keyboard is executed, the processor 201 may display a user interface 503 including a virtual keyboard 503-5 in a partial region of a screen 501 of the electronic device as in FIG. 5. As another example, in a case where a user input for text input (e.g., a touch to a region to which a text can be input) is detected while the application providing (or supporting) the virtual keyboard is executed, the processor 201 may display a user interface 503 including a virtual keyboard 503-5 in a partial region of a screen 501 of the electronic device as in FIG. 5. According to an example embodiment, the user interface 503 may further include a text input region 503-1 in which a string input through the virtual keyboard 503-5, and a recommended word display region 503-3 in which at least one recommended word associated with the string displayed in the text input region 503-1 is displayed.

In process 403, the processor 201 may display a string including one word based on input to the virtual keyboard. For example, in a case where "today" is input through the virtual keyboard 503-5 as in FIG. 5, the processor 201 may display "today" in the text input region 503-1.

In process 405, the processor 201 may determine the at least one recommended word associated with the string based on a language model. For example, the processor 201 may determine (or interpret) whether there is a language model received from an external electronic device in response to the string including one word being input through the virtual keyboard (or in response to the string including one word being displayed in the text input region), and determine the at least one recommended word associated with the string based on the language model of the electronic device and the language model received from the external electronic device in a case when there is a language model received from the external electronic device. In a case when there is not a language model received from the external electronic device, the processor 201 may determine the at least one recommended word associated with the string based on the language model of the electronic device 200.

According to an example embodiment, the processor 201 may acquire a language model from a server (e.g., the server 108 of FIG. 1 or the server 300 of FIG. 3) or the external electronic device based on state information of an external electronic device (e.g., the electronic device 102 or 104 of FIG. 1 or the electronic device 200 of FIG. 2) that is connected for communication with the electronic device 200. For example, the processor 201 may acquire a language model corresponding to the state information of the external electronic device by transmitting a signal for requesting the language model corresponding to the state information of the external electronic device to the server or the external electronic device through a communication circuit (e.g., the communication module 190 of FIG. 1 or the communication circuit 207 of FIG. 2) at a point in time when the state information of the external electronic device is transmitted (or at a point in time when the state information is received from the external electronic device), at a point in time when the user interface including the virtual keyboard is displayed, or at a point in time when the user input to the virtual keyboard is detected, and receiving a response signal of the server or the external electronic device. According to an example embodiment, the processor 201 may receive the state information of the external electronic device from the external electronic device through the communication circuit 207 at a point in time when the connection for communication between the electronic device 200 and the external electronic device is established. According to an example embodiment, the processor 201 may acquire the state information of the external electronic device by transmitting a signal for requesting the state information of the external electronic device to the external electronic device through the communication circuit 207 in response to the connection for communication between the electronic device 200 and the external electronic device being established, and receiving a response signal from the external electronic device. According to an example embodiment, if the user interface including the virtual keyboard is displayed after the connection for communication between the electronic device 200 and the external electronic device is established, the processor 201 may acquire the state information of the external electronic device by transmitting a signal for requesting the state information of the external electronic device to the external electronic device through the communication circuit 207, and receiving a response signal from the external electronic device. According to an example embodiment, in a case where an operation state of the external electronic device or content provided by the external electronic device is changed, the external electronic device connected for communication with the electronic device 200 may retransmit the state information of the external electronic device to the electronic device 200. In this case, the processor 201 may update the language model corresponding to the state information of the external electronic device by reacquiring the language model corresponding to the state information of the external electronic device from the server or the external electronic device based on the state information of the external electronic device.

In process 407, the processor 201 may display at least one recommended word on the user interface. For example, the processor 201 may display the at least one recommended word associated with the string in the recommended word display region 503-3 as in FIG. 5. In a case where input for selecting one of the recommended words is received, the processor 201 may add the selected recommended word to the text input region 503-1.

The above description has been made with reference to an illustrative example, in the case where the electronic device 200 receives the language model corresponding to the state information of the single external electronic device from the single external electronic device, the recommended word is determined based on the language model of the electronic device 200 and the language model corresponding to the state information of the single external electronic device. However, according to various embodiments of the disclosure, even in a case where the electronic device 200 receives a plurality of language models corresponding to state information of a plurality of external electronic devices from the plurality of external electronic devices, the recommended word may be determined based on the language model of the electronic device 200 and the plurality of language models corresponding to the state information of the plurality of external electronic devices.

Figure 6:
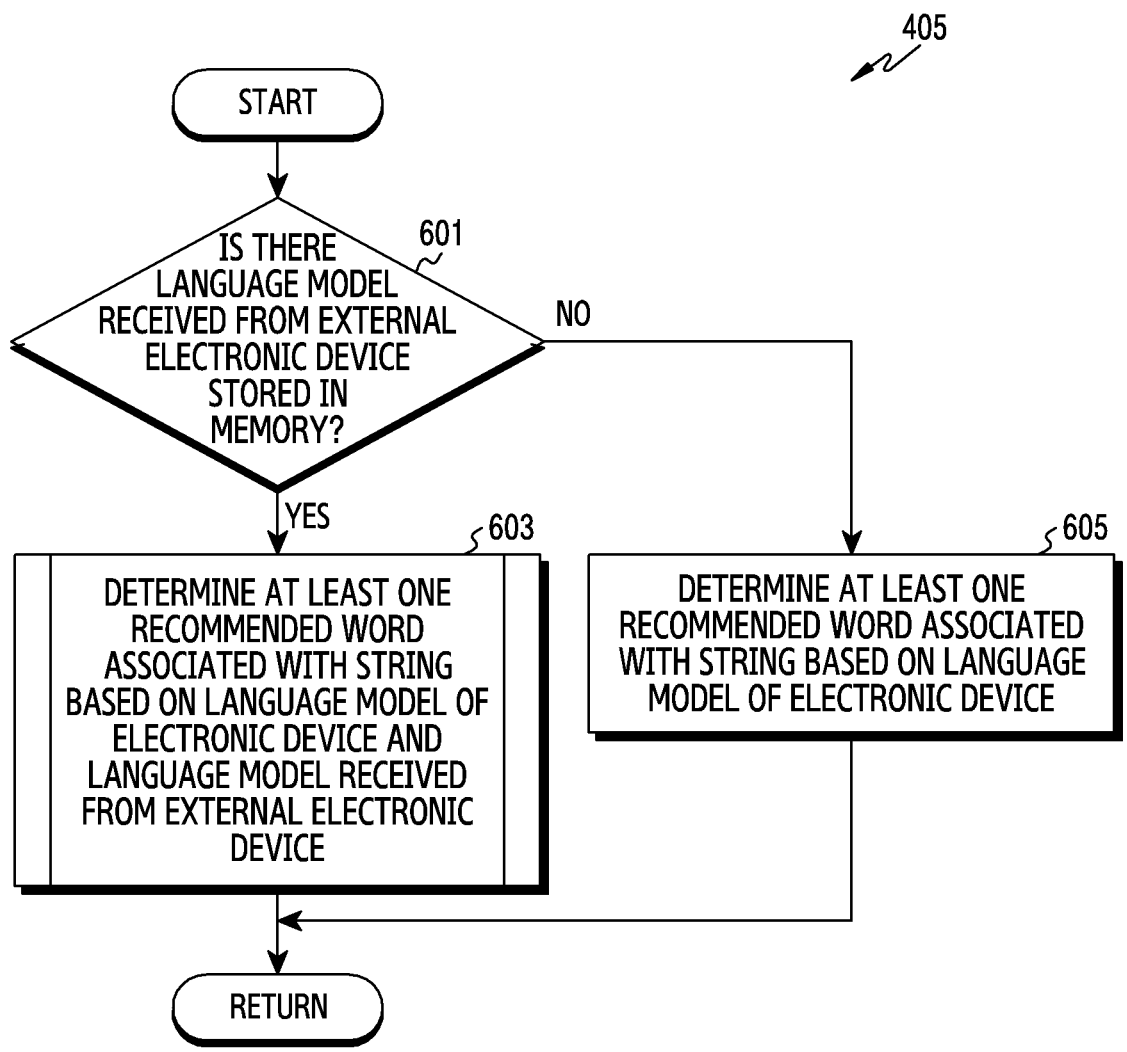
FIG. 6 is a flowchart illustrating an example method of determining a recommended word in the electronic device according to various embodiments.
Figure 7A:
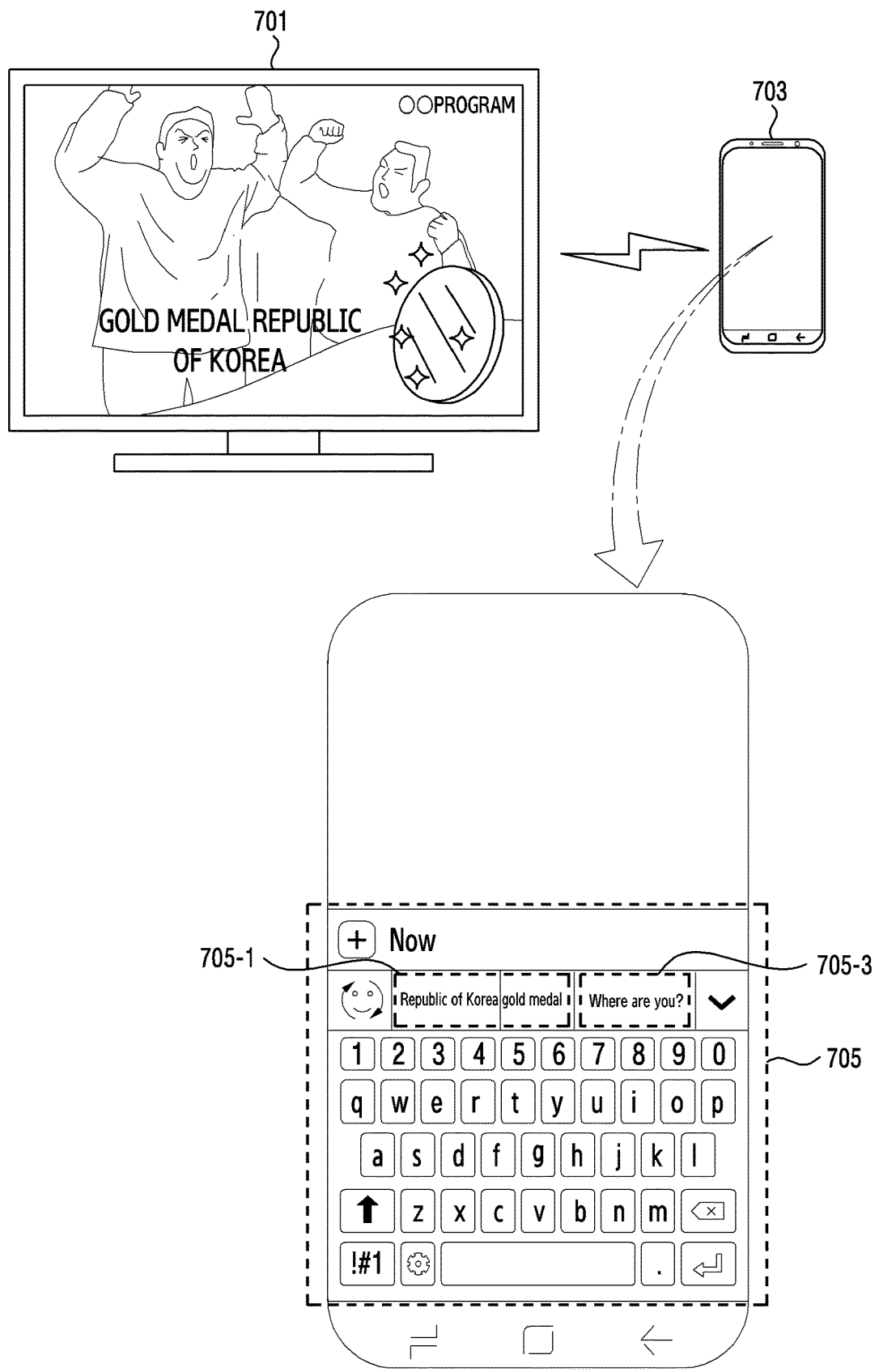
FIG. 7A is an diagram illustrating an example method of determining a recommended word in the electronic device in a case where there is a language model received from an external electronic device according to various embodiments.
Figure 7B:
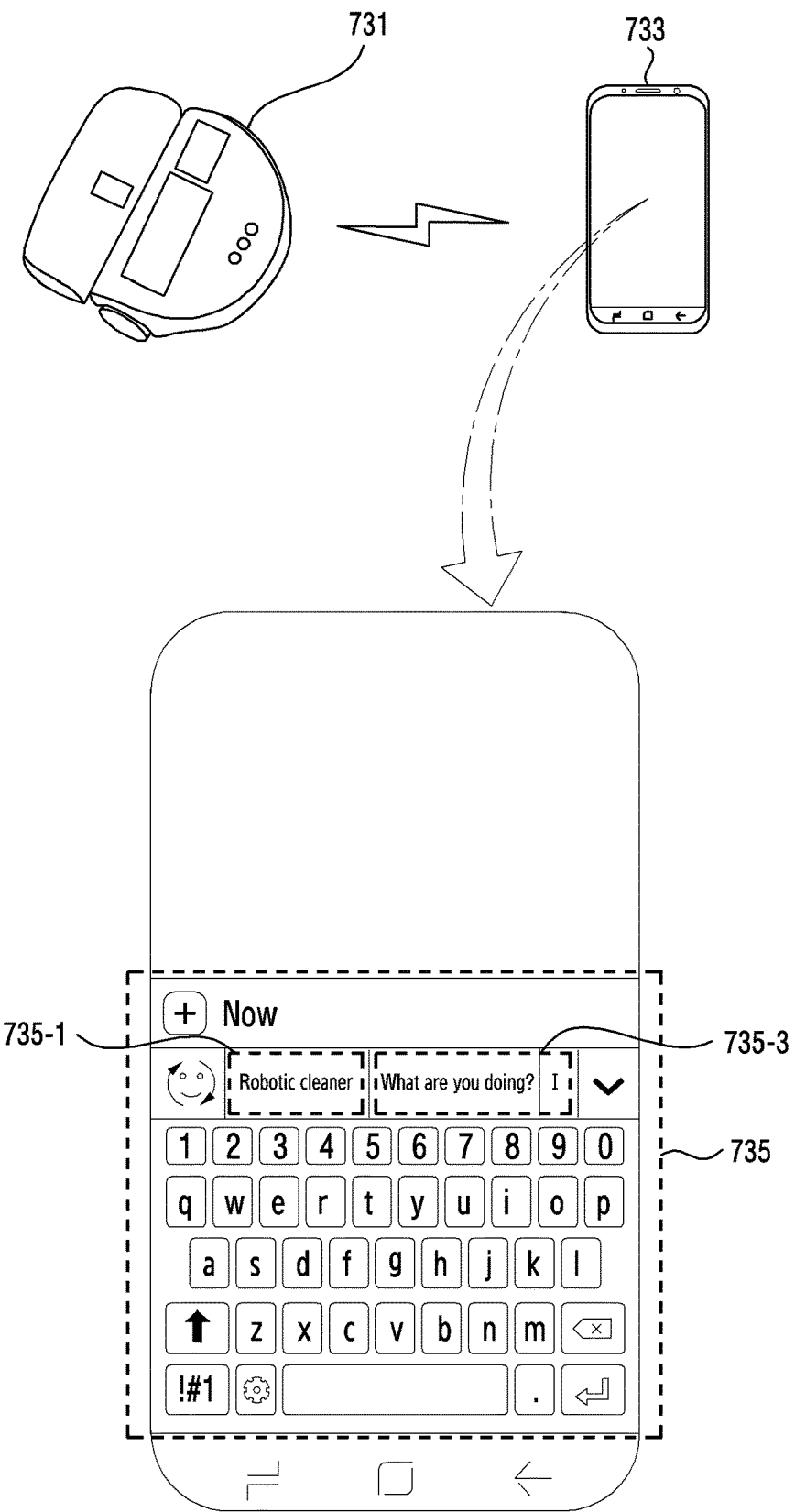
FIG. 7B is another diagram illustrating an example method of determining a recommended word in the electronic device in a case where there is a language model received from an external electronic device according to various embodiments.
Figure 7C:
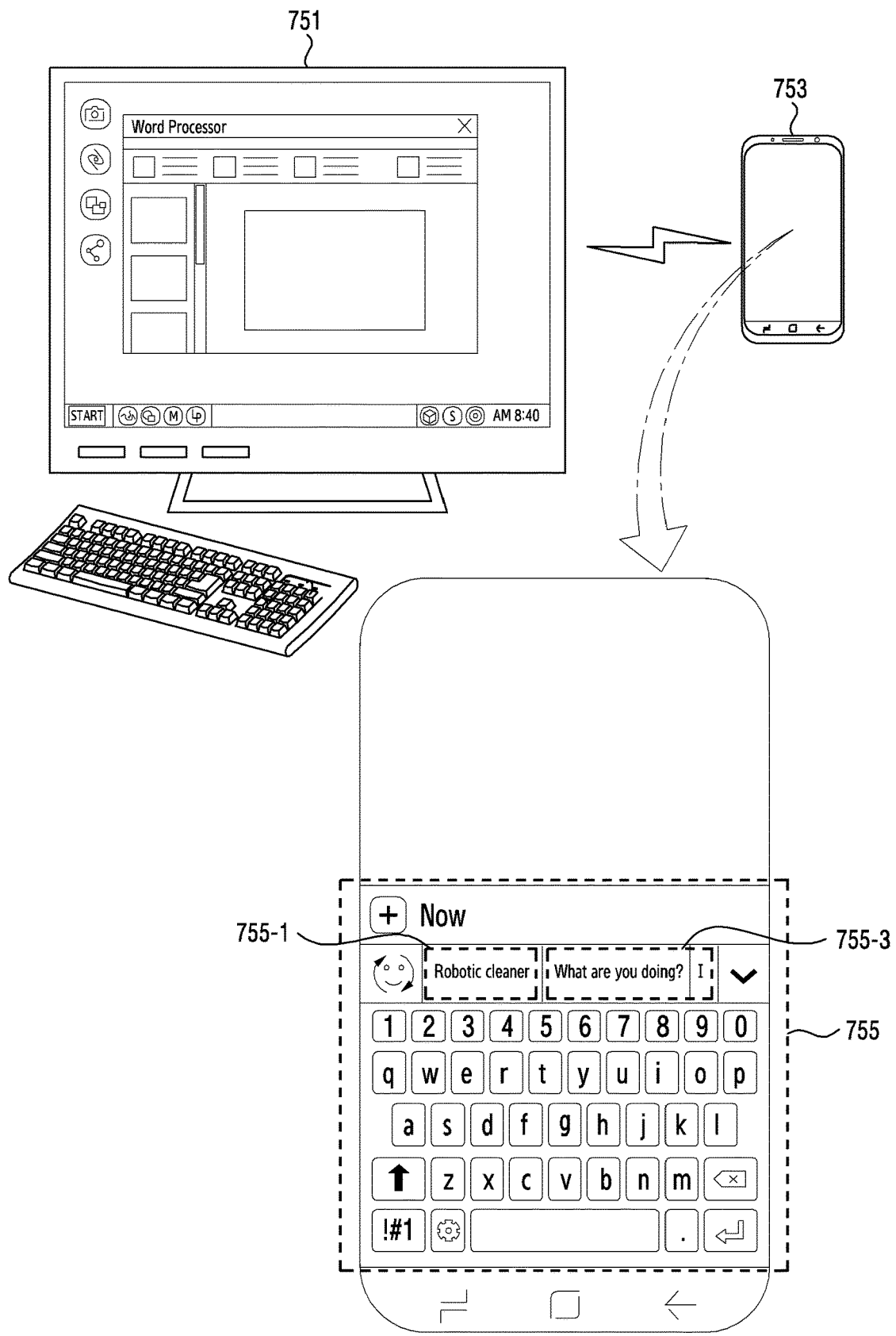
FIG. 7C is diagram illustrating another example method of determining a recommended word in the electronic device in a case where there is a language model received from an external electronic device according to various embodiments.
Figure 8:
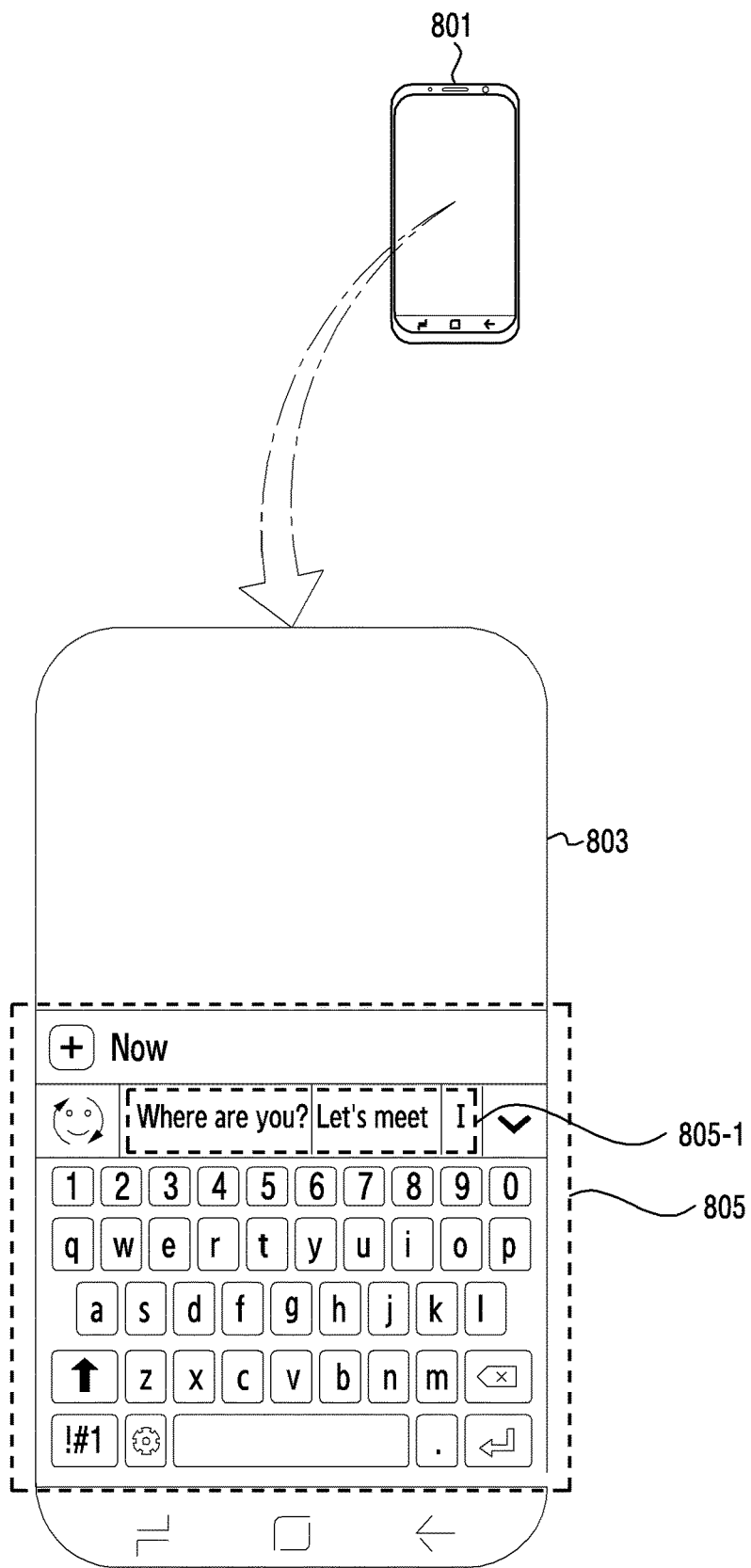
FIG. 8 is diagram illustrating an example method of determining a recommended word in the electronic device according to various embodiments in a case where there is not a language model received from an external electronic device.

FIG. 6 is a flowchart illustrating an example method of determining a recommended word in an electronic device according to various embodiments. FIGS. 7A, 7B, and 7C are diagrams illustrating an example method of determining a recommended word in an electronic device in a case where there is a language model received from an external electronic device according to various embodiments. FIG. 8 is a diagram illustrating an example method of determining a recommended word in an electronic device in a case where there is not a language model received from an external electronic device according to various embodiments. The following description may apply to details of process 405 of FIG. 4 that determines the at least one recommended word associated with the string.

Referring to FIGS. 6, 7A, 7B, 7C, and 8, in process 601, in a case where a string including one word is input through a virtual keyboard (or in a case where a string including one word is displayed based on input to a virtual keyboard), a processor (e.g., the processor 120 of FIG. 1 or the processor 201 of FIG. 2) of an electronic device (e.g., the electronic device 101 of FIG. 1 or the electronic device 200 of FIG. 2) may determine whether a language model received from an external electronic device (e.g., the electronic device 102 or 104 of FIG. 1 or the electronic device 200 of FIG. 2) is stored in a memory (e.g., the memory 130 of FIG. 1 or the memory 203 of FIG. 2). For example, as information about an image output through a screen of an external electronic device 701 (e.g., a TV) connected for communication with an electronic device 703 is received from the external electronic device 701 as in FIG. 7A, in a case where a language model (e.g., "Republic of Korea" and/or "gold medal") corresponding to the image output through the screen of the external electronic device 701 is acquired from a server (e.g., the server 108 of FIG. 1 or the server 300 of FIG. 3) or the external electronic device 701, the processor 201 may determine that there is a language model received from the external electronic device 701. As another example, as information associated with a name of an external electronic device 731 (e.g., a robotic cleaner) connected for communication with an electronic device 733 is received from the external electronic device 731 as in FIG. 7B, in a case where a language model (e.g., "robotic cleaner") corresponding to the name of the external electronic device 731 is acquired from a server or the external electronic device 731, the processor 201 may determine that there is a language model received from the external electronic device 731. As another example, as information about an application executed on an external electronic device 751 (e.g., a PC) connected for communication with an electronic device 753 is received as in FIG. 7C, in a case where a language model (e.g., "word processor") corresponding to the application executed on the external electronic device 751 is acquired from a server or the external electronic device 751, the processor 201 may determine that there is a language model received from the external electronic device 751. As another example, in a case where the connection for communication between an electronic device 801 and an external electronic device is not established as in FIG. 8, the processor 201 may determine that there is not a language model received from the external electronic device. In the case where there is a language model received from the external electronic device, the processor 201 may perform process 603. In the case where there is not a language model received from the external electronic device, the processor 201 may perform process 605.

In the case where there is a language model received from the external electronic device, the processor 201 may determine at least one recommended word associated with a string based on the language model of the electronic device and the language model received from the external electronic device in process 603. According to an example embodiment, the processor 201 may determine at least one first recommended word associated with a string based on the language model of the electronic device, determine at least one second recommended word associated with a string based on the language model received from the external electronic device, and determine the at least one first recommended word and the at least one second recommended word as the recommended word associated with the string. For example, as in FIG. 7A, the processor 201 may determine at least one first recommended word 705-3 (e.g., "where are you?") corresponding to a string (e.g., "now") based on the language model of the electronic device 703, determine at least one second recommended word 705-1 (e.g., "Republic of Korea" and/or "gold medal") corresponding to a string based on the language model corresponding to the image output through the screen of the external electronic device 701, and display the at least one first recommended word 705-3 and the at least one second recommended word 705-1 in a recommended word display region of the user interface 705. As another example, as in FIG. 7B, the processor 201 may determine at least one first recommended word 735-3 (e.g., "what are you doing" and/or "I") corresponding to a string (e.g., "now") based on the language model of the electronic device 733, determine at least one second recommended word 735-1 (e.g., "robotic cleaner") corresponding to a string based on the language model corresponding to the name of the external electronic device 731, and display the at least one first recommended word 735-3 and the at least one second recommended word 735-1 in a recommended word display region of the user interface 735. As another example, as in FIG. 7C, the processor 201 may determine at least one first recommended word 755-3 (e.g., "what are you doing" and/or "I") corresponding to a string (e.g., "now") based on the language model of the electronic device 753, determine at least one second recommended word 755-1 (e.g., "word processor") corresponding to a string based on the language model corresponding to the application executed on the external electronic device 751, and display the at least one first recommended word 755-3 and the at least one second recommended word 755-1 in a recommended word display region of the user interface 755. According to an example embodiment, without dividing the language model of the electronic device and the language model received from the external electronic device to determine the recommended words, the processor 201 may determine the at least one recommended word associated with the string from the two language models. According to an example embodiment, the processor 201 may determine at least one recommended word in the order in which a probability to be used after the string corresponding to the user input is high among a plurality of recommended words included in the language model of the electronic device and the language model received from the external electronic device. According to an example embodiment, the processor 201 may determine at least one recommended word using an artificial neural network model for which the language model of the electronic device and the language model received from the external electronic device are used.

In the case where there is not a language model received from the external electronic device, the processor 201 may determine at least one recommended word associated with the string based on the language model of the electronic device in process 605. For example, as in FIG. 8, the processor 201 may determine at least one recommended word 805-1 (e.g., "where are you?", "let's meet", and/or "I") corresponding to a string (e.g., "now") based on the language model of the electronic device 801, and display the determined recommended word in a recommended word display region of the user interface 805 displayed on a screen 803 of the electronic device 801. According to an example embodiment, the processor 201 may determine at least one recommended word in the order in which a probability to be used after the string corresponding to the user input is high among a plurality of recommended words included in the language model. According to an example embodiment, the processor 201 may determine at least one recommended word using an artificial neural network model for which the language model of the electronic device is used.

The above description has been made with reference to an illustrative example, in the case where the connection for communication between the electronic device and the single external electronic device is established, the recommended word is determined based on the language model of the electronic device and the language model corresponding to the state information of the single external electronic device. However, according to various embodiments of the disclosure, even in a case where the connection for communication between the electronic device and a plurality of external electronic devices is established, the recommended word may be determined based on the language model of the electronic device and at least one language model corresponding to the state information of at least one of the plurality of external electronic devices. For example, the electronic device may receive a plurality of pieces of state information from a plurality of external electronic devices connected for communication with the electronic device, acquire language models corresponding to the received pieces of state information from a server or the plurality of external electronic devices, and determine a recommended word using the acquired language models and the language model of the electronic device. As another example, the electronic device may determine at least one external electronic device to be considered as a language model among a plurality of external electronic devices based on state information received from the plurality of external electronic devices connected for communication with the electronic device, acquire at least one language model corresponding to at least one state information, which is received from the determined at least one external electronic device, from a server or the determined at least one external electronic device, and determine a recommended word using the acquired at least one language model and a language model of the electronic device. In this case, the processor 201 may determine at least one external electronic device to be considered as a language model based on information about a point in time when a user input included in the pieces of state information is finally received, and determine the at least one external electronic device to be considered as the language model based on a signal intensity of the external electronic device. For example, the processor 201 may determine at least one external electronic device as a device to be considered as a language model in the order in which a point in time when a user input is received is slowest among the plurality of external electronic devices. As another example, the processor 201 may determine at least one external electronic device to be considered as a language model in the order in which an intensity of a signal transmitting state information is strong among the plurality of external electronic devices.

Figure 9:
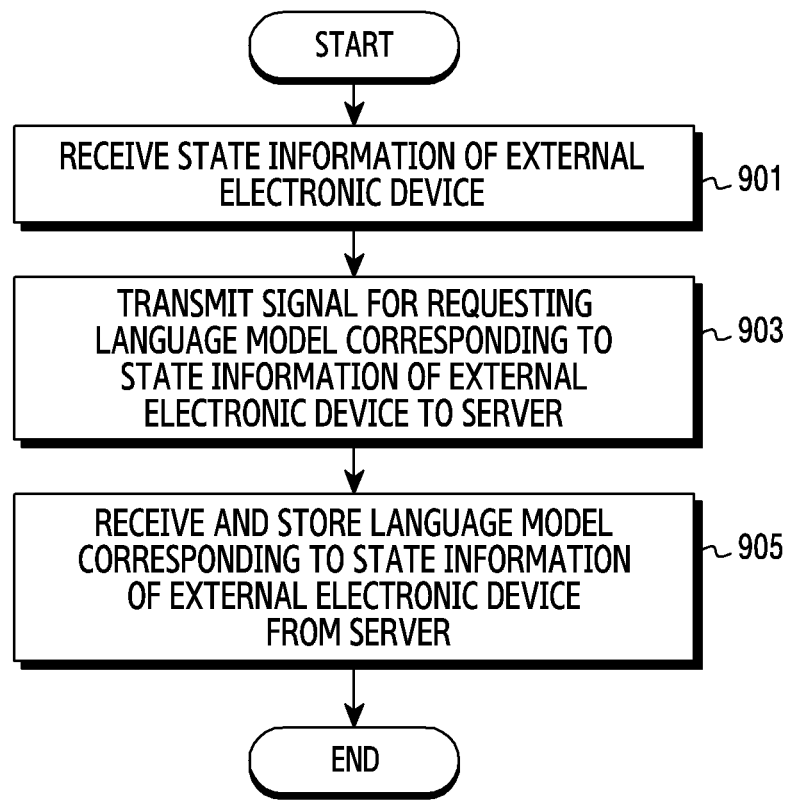
FIG. 9 is a flowchart illustrating an example method of receiving a language model from an external electronic device in the electronic device according to various embodiments.

FIG. 9 is a flowchart illustrating an example method of receiving a language model from an external electronic device in an electronic device according to various embodiments.

Referring to FIG. 9, in process 901, a processor (e.g., the processor 120 of FIG. 1 or the processor 201 of FIG. 2) of an electronic device (e.g., the electronic device 101 of FIG. 1 or the electronic device 200 of FIG. 2) may receive state information of an external electronic device (e.g., the electronic device 102 or 104 of FIG. 1 or the electronic device 200 of FIG. 2) through a communication circuit (e.g., the communication module 190 of FIG. 1 or the communication circuit 207 of FIG. 2). For example, the processor 201 may receive the state information of the external electronic device from the external electronic device through the communication circuit 207 at a point in time when the electronic device 200 establishes the connection for communication with the external electronic device. As another example, if a user interface including a virtual keyboard is displayed on the electronic device 200 after the electronic device 200 establishes the connection for communication with the external electronic device, the processor 201 may receive the state information of the external electronic device from the external electronic device by transmitting the state information of the external electronic device to the external electronic device through the communication circuit 207, and receiving a response signal from the external electronic device. According to an example embodiment, the state information of the external electronic device may include at least one of information associated with a name of the external electronic device (e.g., model information or information about a name of the external electronic device which is set by a user), information associated with an operation state of the external electronic device (e.g., operation mode information), information associated with content provided by the external electronic device (e.g., information about at least one of an image or picture displayed on a screen, or a sound, or information about an application that is in execution), and information about a point in time when a user input is finally received.

In process 903, the processor 201 may transmit a signal for requesting the language model corresponding to the state information of the external electronic device to a server (e.g., the server 108 of FIG. 1 or the server 300 of FIG. 3) through the communication circuit 207. According to an example embodiment, the signal for requesting the language model corresponding to the state information of the external electronic device may include at least one of the information associated with the name of the external electronic device, the information associated with the operation state of the external electronic device, and the information associated with the content provided by the external electronic device. According to an example embodiment, in a case where the server 300 receives the signal for requesting the language model corresponding to the state information of the external electronic device from the electronic device 200, the server 300 may identify a language model corresponding to the name of the external electronic device, a language model corresponding to the operation state of the external electronic device, and/or a language model corresponding to the content provided by the external electronic device, and transmit the identified language model to the electronic device 200.

In process 905, the processor 201 may receive the language model corresponding to the state information of the external electronic device from the server 300 through the communication circuit 207, and store it in a memory (e.g., the memory 130 of FIG. 1 or the memory 203 of FIG. 2). According to various embodiments, as a state of the external electronic device is changed, in a case where the changed state information of the external electronic device is received from the external electronic device, the processor 201 may update the language model corresponding to the state information of the external electronic device by re-performing processes 903 to 905. According to various embodiments, in a case where a language model of the server 300 is updated, the server 300 may re-identify the language model corresponding to the state information of the external electronic device based on the updated language model, and transmit the re-identified language model to the electronic device 200. Thereby, the electronic device 200 may update the language model corresponding to the state information of the external electronic device.

Figure 10:
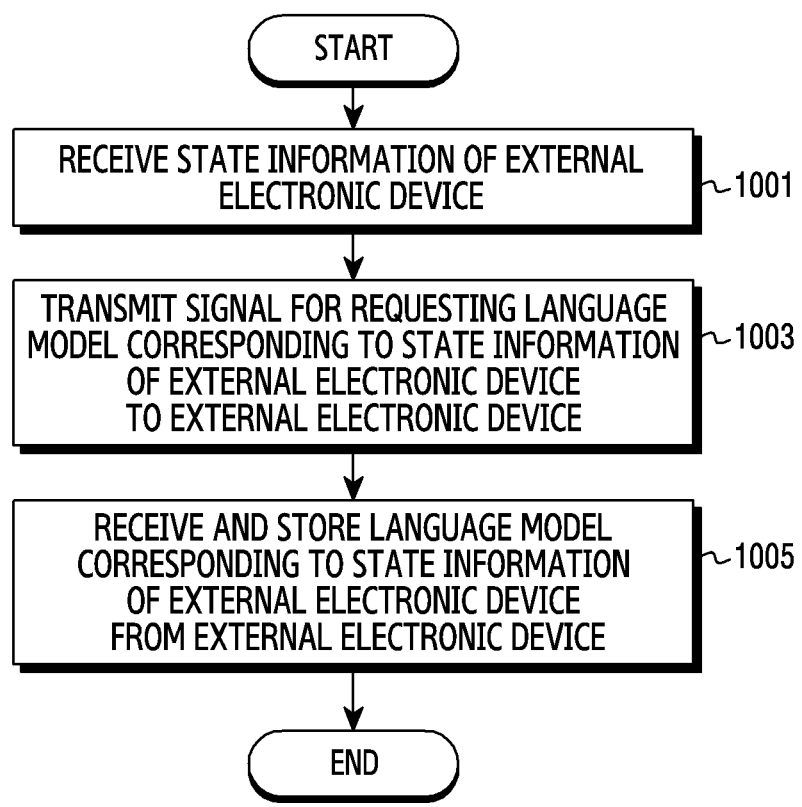
FIG. 10 is a flowchart illustrating another example method of receiving a language model from an external electronic device in the electronic device according to various embodiments.

FIG. 10 is a flowchart illustrating another example method of receiving a language model from an external electronic device in an electronic device according to various embodiments.

Referring to FIG. 10, in process 1001, a processor (e.g., the processor 120 of FIG. 1 or the processor 201 of FIG. 2) of an electronic device (e.g., the electronic device 101 of FIG. 1 or the electronic device 200 of FIG. 2) may receive state information of an external electronic device (e.g., the electronic device 102 or 104 of FIG. 1 or the electronic device 200 of FIG. 2) through a communication circuit (e.g., the communication module 190 of FIG. 1 or the communication circuit 207 of FIG. 2). For example, the processor 201 may receive the state information of the external electronic device from the external electronic device through the communication circuit 207 at a point in time when the electronic device 200 establishes the connection for communication with the external electronic device. As another example, if a user interface including a virtual keyboard is displayed on the electronic device 200 after the electronic device 200 establishes the connection for communication with the external electronic device, the processor 201 may receive the state information of the external electronic device from the external electronic device by transmitting the state information of the external electronic device to the external electronic device through the communication circuit 207, and receiving a response signal from the external electronic device. According to an example embodiment, the state information of the external electronic device may include at least one of information associated with a name of the external electronic device (e.g., model information or information about a name of the external electronic device which is set by a user), information associated with an operation state of the external electronic device (e.g., operation mode information), information associated with content provided by the external electronic device (e.g., information about at least one of an image or picture displayed on a screen, or a sound, or information about an application that is in execution), and information about a point in time when a user input is finally received.

In process 1003, the processor 201 may transmit a signal for requesting the language model corresponding to the state information of the external electronic device to the external electronic device through the communication circuit 207. According to an example embodiment, the signal for requesting the language model corresponding to the state information of the external electronic device may include at least one of the information associated with the name of the external electronic device, the information associated with the operation state of the external electronic device, and the information associated with the content provided by the external electronic device. According to an example embodiment, in a case where the external electronic device receives the signal for requesting the language model corresponding to the state information of the external electronic device from the electronic device 200, the external electronic device may identify a language model corresponding to the name of the external electronic device, a language model corresponding to the operation state of the external electronic device, and/or a language model corresponding to the content provided by the external electronic device, and transmit the identified language model to the electronic device 200.

In process 1005, the processor 201 may receive the language model corresponding to the state information of the external electronic device from the external electronic device through the communication circuit 207, and store it in a memory (e.g., the memory 130 of FIG. 1 or the memory 203 of FIG. 2). According to various embodiments, as a state of the external electronic device is changed, in a case where the changed state information of the external electronic device is received from the external electronic device, the processor 201 may update the language model corresponding to the state information of the external electronic device by re-performing processes 1003 to 1005. According to various embodiments, in a case where the language model of the external electronic device is updated, the external electronic device may re-identify the language model corresponding to the state information of the external electronic device based on the updated language model, and transmit the re-identified language model to the electronic device 200. Thereby, the electronic device 200 may update the language model corresponding to the state information of the external electronic device.

Figure 11:
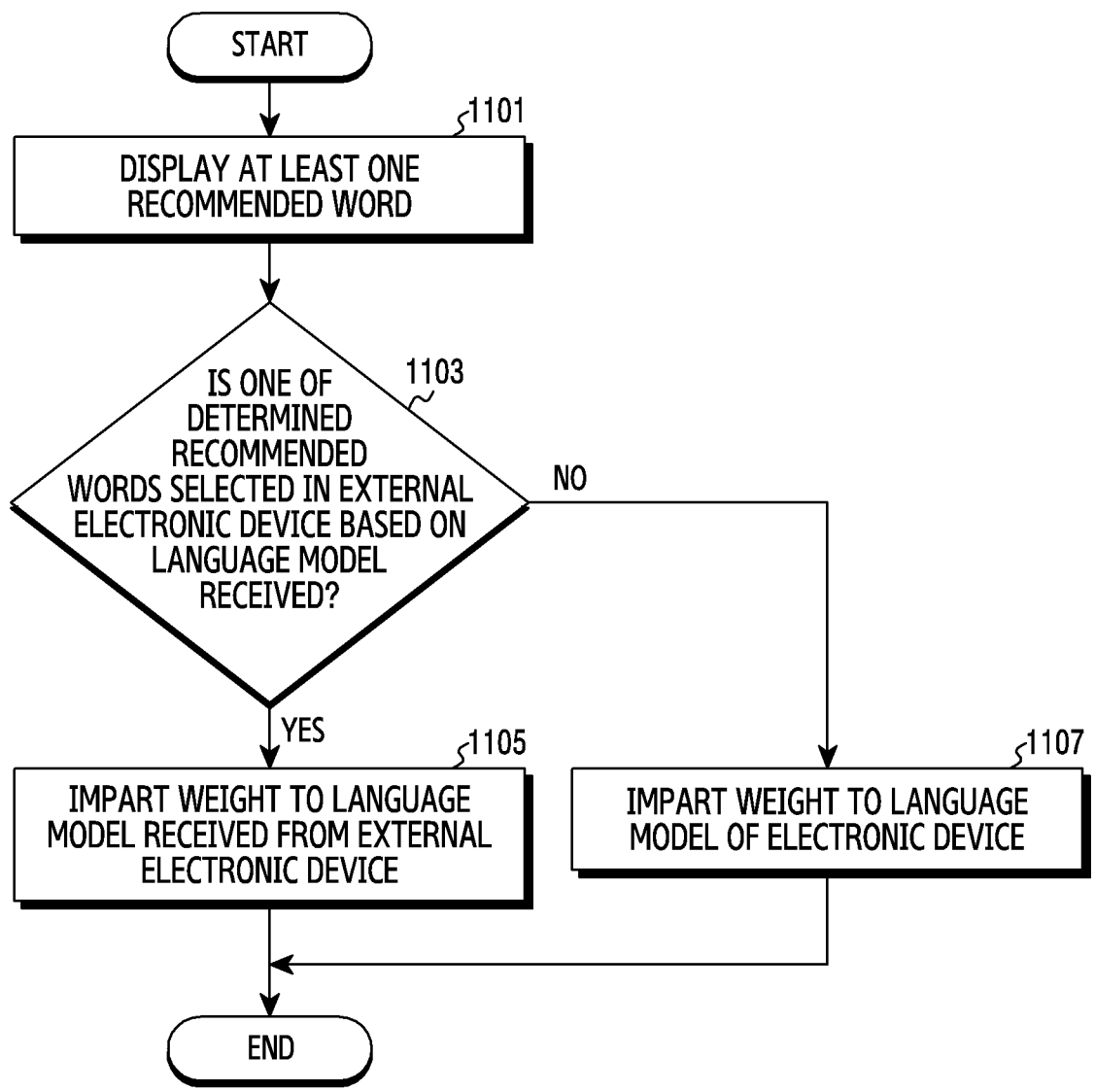
FIG. 11 is a flowchart illustrating an example method of imparting a weight to a language model of the electronic device or a language model received from the external electronic device in the electronic device according to various embodiments.

FIG. 11 is a flowchart 1100 illustrating an example method of imparting a weight to a language model of an electronic device or a language model received from an external electronic device in the electronic device according to various embodiments. The following description may be made of processes performed after process 407 that displays the at least one recommended word on the user interface in FIG. 4.

Referring to FIG. 11, in process 1101, the electronic device 200 may display at least one recommended word. In process 1103, the processor (e.g., the processor 120 of FIG. 1 or the processor 201 of FIG. 2) of the electronic device (e.g., the electronic device 101 of FIG. 1 or the electronic device 200 of FIG. 2) may determine (or interpret) whether any one of the recommended words determined based on the language model received from the external electronic device is selected. For example, as in FIG. 7A, the processor 201 may determine whether an input for selecting the recommended word 705-1 determined based on the language model corresponding to the image output through the screen of the external electronic device 701 among a plurality of recommended words (e.g., "Republic of Korea" and/or "gold medal", and "where are you") is received. In a case where any one of the recommended words (e.g., "Republic of Korea" and/or "gold medal") determined based on the received language model is selected in the external electronic device, the processor 201 may perform process 1105. In the case where any one of the recommended words (e.g., "where are you") determined based on the language model of the electronic device is selected, the processor 201 may perform process 1107.

In the case where one of the recommended words determined based on the received language model is selected in the external electronic device, the processor 201 may impart a weight to the language model received from the external electronic device in process 1105. For example, the case where any one of the recommended words determined based on the received language model (e.g., the language model corresponding to the state information of the external electronic device) is selected in the external electronic device, the processor 201 may increase the weight of the language model received from the external electronic device.

In the case where any one of the recommended words determined based on the language model of the electronic device is selected, the processor 201 may impart a weight to the language model of the electronic device in process 1107. For example, in the case where any one of the recommended words determined based on the language model of the electronic device is selected, the processor 201 may increase the weight of the language model of the electronic device.

According to various embodiments, the processor 201 may determine at least one recommended word associated with a string based on the weight received from the external electronic device and the weight of the language model of the electronic device. For example, in a case where the weight received from the external electronic device is higher than the weight of the language model of the electronic device, the processor 201 may display more recommended words determined based on the language model of the external electronic device than the recommended words determined based on the language model of the electronic device. As another example, in a case where the weight of the language model of the electronic device is higher than the weight received from the external electronic device, the processor 201 may display more recommended words determined based on the language model of the electronic device than the recommended words determined based on the language model received from the external electronic device.

Figure 12:
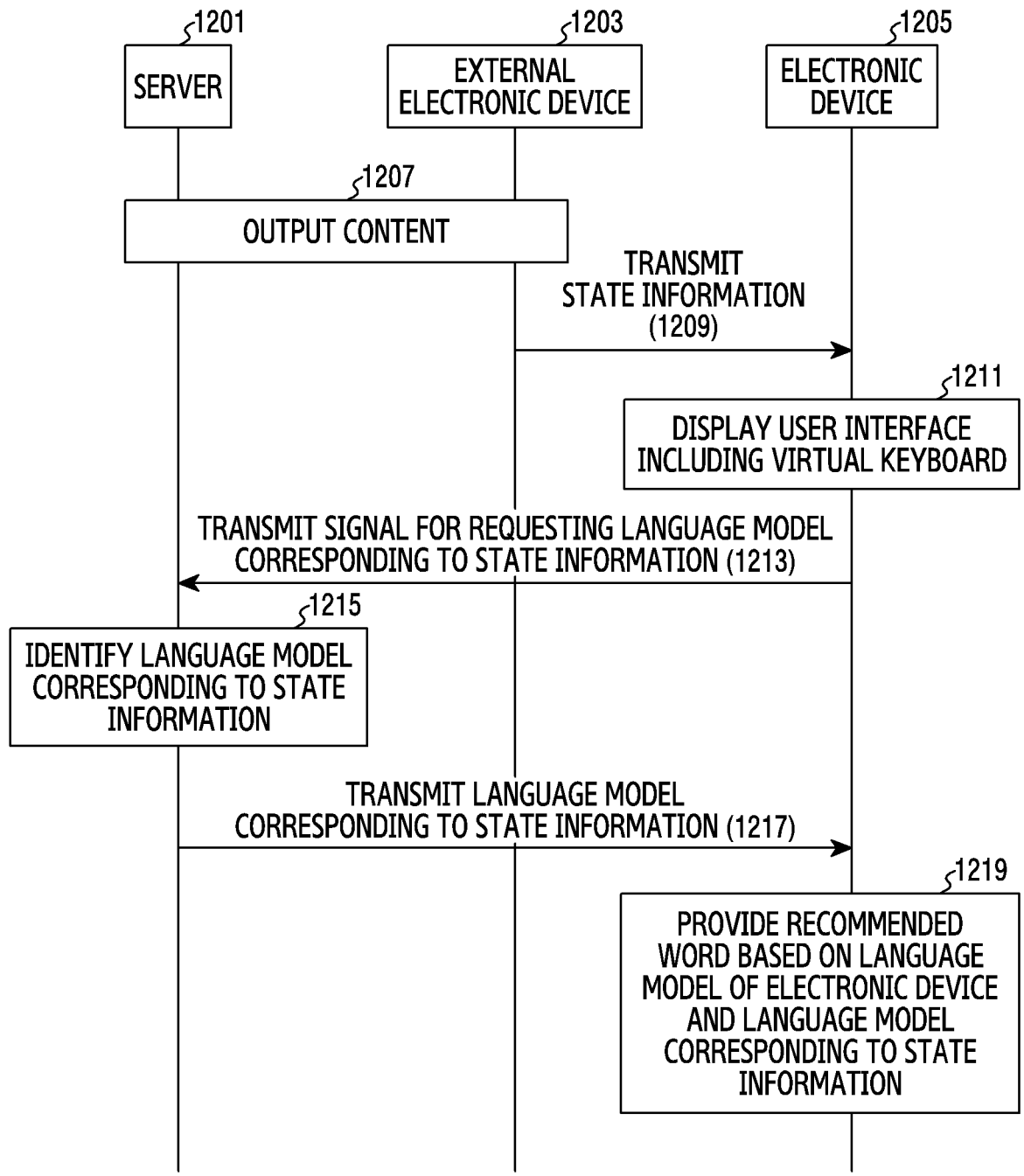
FIG. 12 is a signal flow diagram illustrating an example of signaling between the electronic device and external electronic devices according to various embodiments.

FIG. 12 is a signal flow diagram illustrating an example of signaling between an electronic device and external electronic devices according to various embodiments.

Referring to FIG. 12, in process 1207, an external electronic device 1203 (e.g., the electronic device 102 or 104 of FIG. 1 or the electronic device 200 of FIG. 2) may receive and output content from a server 1201 (e.g., the server 108 of FIG. 1 or the server 300 of FIG. 3). For example, the external electronic device 1203 may receive and output at least one of music and an image or picture from the server 1201. According to an example embodiment, the server 1201 may be a server that controls (or manages) both services providing content and services providing language models. In process 1209, the external electronic device 1203 may transmit state information of the external electronic device 1203 to an electronic device 1205 connected for communication with the external electronic device 1203 in response to output of the content. For example, the external electronic device 1203 may transmit state information, which includes at least one of information associated with a name of the external electronic device 1203, information associated with an operation state of the external electronic device 1203, information associated with content provided by the external electronic device 1203, and information about a point in time when a user input is finally received, to the electronic device 1205. In process 1211, the electronic device 1205 may display a user interface including a virtual keyboard. For example, the electronic device 1205 may display a user interface including a virtual keyboard in response to execution of an application (e.g., a message application, an SNS application, or an intelligent application) providing (or supporting) the virtual keyboard. In process 1213, the electronic device 1205 may provide a signal for requesting the language model corresponding to the state information of the external electronic device for the server 1201 in response to the user interface including the virtual keyboard being displayed. For example, the electronic device 1205 may transmit a signal for requesting at least one of the language model corresponding to the name of the external electronic device 1203, the language model corresponding to the operation state of the external electronic device 1203, and the language model corresponding to the content provided by the external electronic device 1203 to the server 1201. In process 1215, the server 1201 may identify the language model corresponding to the state information of the external electronic device 1203 among the language models of the server 1201 in response to reception of the signal for requesting the language model corresponding to the state information of the external electronic device 1203. In process 1217, in a case where the language model corresponding to the state information of the external electronic device 1203 is identified, the server 1201 may transmit the identified language model corresponding to the state information of the external electronic device 1203 to the electronic device 1205. In process 1219, the electronic device 1205 may provide a recommended word based on the language model of the electronic device 1205 and the language model corresponding to the state information of the external electronic device 1203. For example, in response to a string including one word being input through the virtual keyboard, the electronic device 1205 may determine at least one recommended word associated with the string based on the language model of the electronic device 1205 and the language model corresponding to the state information of the external electronic device 1203, and display the determined at least one recommended word in a recommended word display region of the user interface.

The above description has been made with reference to an illustrative example, in the case where the user interface including the virtual keyboard is displayed on the electronic device 1205 while (after) the external electronic device 1203 outputs the content, the recommended word is provided using the language model of the electronic device 1205 and the language model corresponding to the state information of the external electronic device 1203. However, according to various embodiments of the disclosure, even in a case where the content is output to the external electronic device 1203 after the user interface including the virtual keyboard is displayed on the electronic device 1205, the recommended word is provided using the language model of the electronic device 1205 and the language model corresponding to the state information of the external electronic device 1203. For example, in a case where the state information of the external electronic device 1203 is received from the external electronic device 1203 while the electronic device 1205 displays the user interface including the virtual keyboard, the electronic device 1205 may transmit the signal for requesting the language model corresponding to the state information of the external electronic device 1203 to the server 1201, and determine the recommended word based on the language model of the electronic device 1205 and the language model corresponding to the state information of the external electronic device 1203 if the language model corresponding to the state information of the external electronic device 1203 is received from the server 1201.

Figure 13:
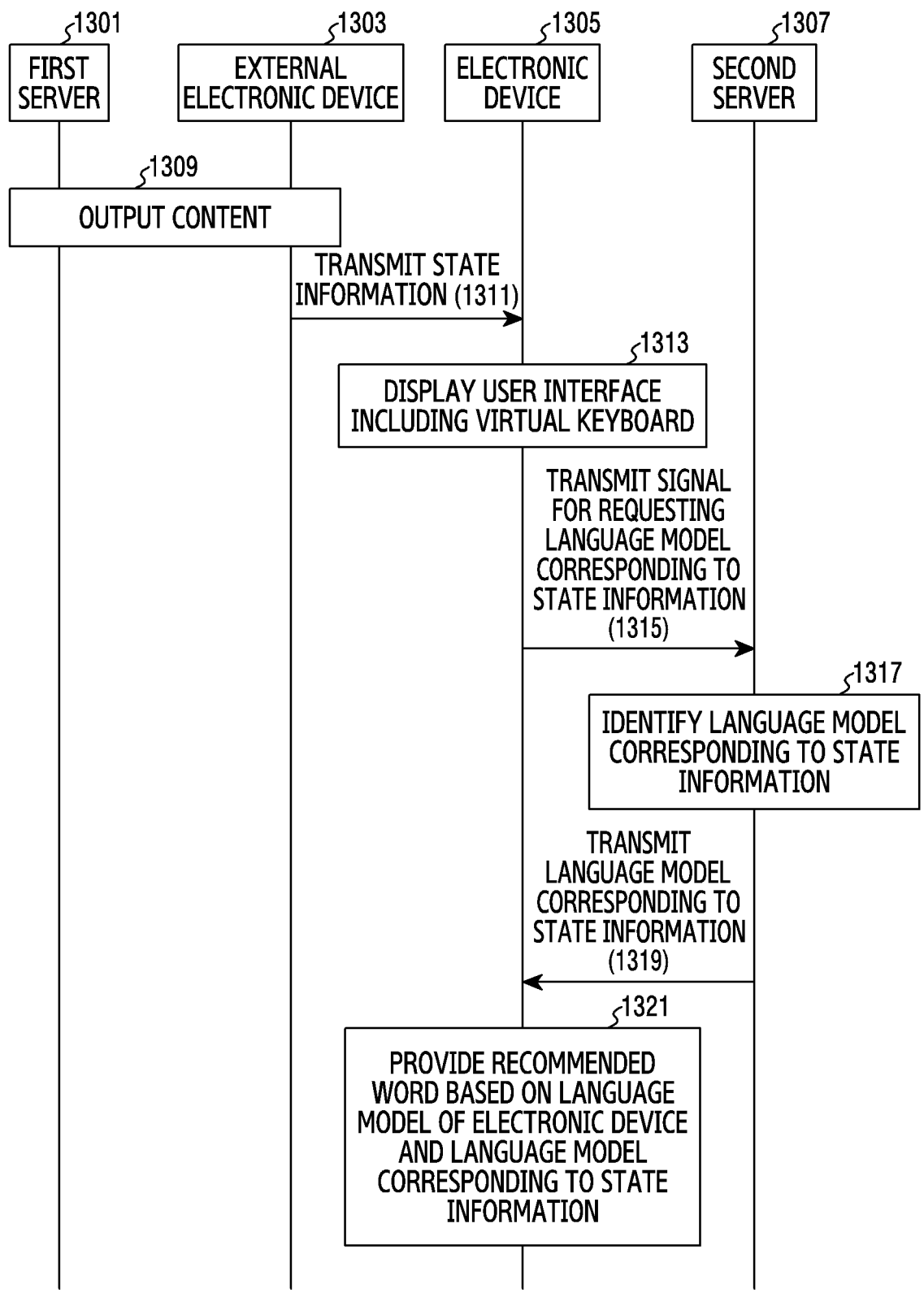
FIG. 13 is a signal flow diagram illustrating another example of signaling between the electronic device and external electronic devices according to various embodiments.

FIG. 13 is a signal flow diagram illustrating another example of signaling between an electronic device and external electronic devices according to various embodiments.

Referring to FIG. 13, in process 1309, an external electronic device 1303 (e.g., the electronic device 102 or 104 of FIG. 1 or the electronic device 200 of FIG. 2) may receive and output content from a first server 1301 (e.g., the server 108 of FIG. 1 or the server 300 of FIG. 3). For example, the external electronic device 1303 may receive and output at least one of music and an image or picture from the first server 1301. According to an example embodiment, the first server 1301 may be a server that controls (or manages) both services providing content and services providing language models. In process 1311, the external electronic device 1303 may transmit state information to an electronic device 1305 connected for communication with the external electronic device 1303 in response to output of the content. For example, the external electronic device 1303 may transmit state information, which includes at least one of information associated with a name of the external electronic device 1303, information associated with an operation state of the external electronic device 1303, information associated with content provided by the external electronic device 1303, and information about a point in time when a user input is finally received, to the electronic device 1305. In process 1313, the electronic device 1305 may display a user interface including a virtual keyboard. For example, the electronic device 1305 may display a user interface including a virtual keyboard in response to execution of an application (e.g., a message application, an SNS application, or an intelligent application) providing (or supporting) the virtual keyboard. In process 1315, the electronic device 1305 may transmit a signal for requesting the language model corresponding to the state information of the external electronic device 1303 for a second server 1307 (e.g., the server 108 of FIG. 1 or the server 300 of FIG. 3) in response to the user interface including the virtual keyboard being displayed. For example, the electronic device 1305 may transmit a signal for requesting at least one of the language model corresponding to the name of the external electronic device 1303, the language model corresponding to the operation state of the external electronic device 1303, and the language model corresponding to the content provided by the external electronic device 1303 to the second server 1307. According to an example embodiment, the second server 1307 may be a server that controls (or manages) services providing language models. In process 1317, the second server 1307 may identify the language model corresponding to the state information of the external electronic device 1303 among the language models of the second server 1307 in response to reception of the signal for requesting the language model corresponding to the state information of the external electronic device 1303. In process 1319, the second server 1307 may transmit the identified language model corresponding to the state information of the external electronic device 1303 to the electronic device 1305 in response to the identification of the language model corresponding to the state information of the external electronic device 1303. In process 1321, the electronic device 1305 may provide a recommended word based on the language model of the electronic device 1305 and the language model corresponding to the state information of the external electronic device 1303. For example, in response to a string including one word being input through the virtual keyboard, the electronic device 1305 may determine at least one recommended word associated with the string based on the language model of the electronic device 1305 and the language model corresponding to the state information of the external electronic device 1303, and display the determined at least one recommended word in a recommended word display region of the user interface.

The above description has been made with reference to an illustrative example, in the case where the user interface including the virtual keyboard is displayed on the electronic device 1305 while (after) the external electronic device 1303 outputs the content, the recommended word is provided using the language model of the electronic device 1305 and the language model corresponding to the state information of the external electronic device 1303. However, according to various embodiments of the disclosure, even in a case where the content is output to the external electronic device 1303 after the user interface including the virtual keyboard is displayed on the electronic device 1305, the recommended word is provided using the language model of the electronic device 1305 and the language model corresponding to the state information of the external electronic device 1303. For example, in a case where the state information of the external electronic device 1303 is received from the external electronic device 1303 while the electronic device 1305 displays the user interface including the virtual keyboard, the electronic device 1305 may transmit the signal for requesting the language model corresponding to the state information of the external electronic device 1303 to the second server 1307, and determine the recommended word based on the language model of the electronic device 1305 and the language model corresponding to the state information of the external electronic device 1303 if the language model corresponding to the state information of the external electronic device 1303 is received from the second server 1307.

Figure 14:
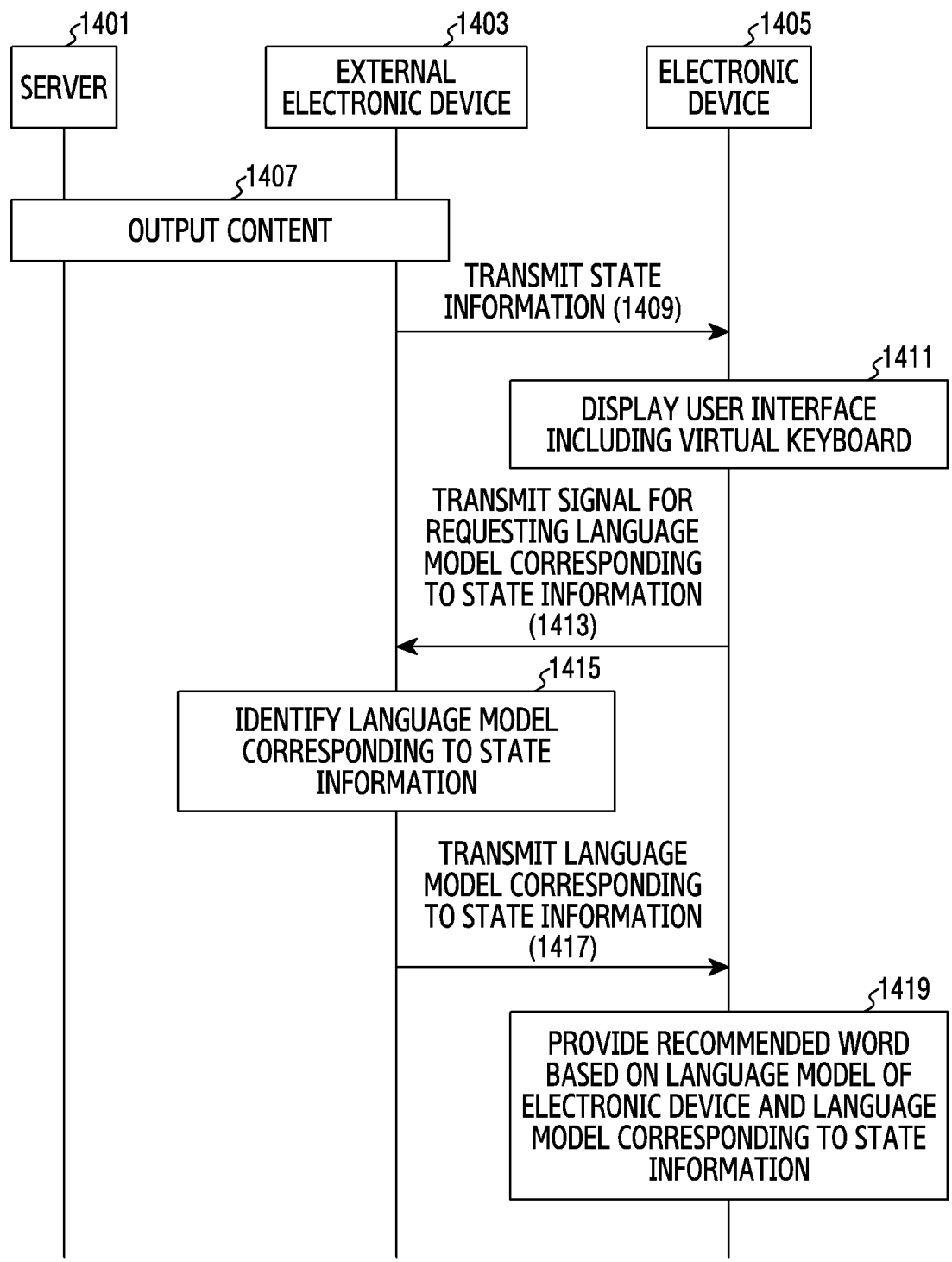
FIG. 14 is a signal flow diagram illustrating another example of signaling between the electronic device and external electronic devices according to various embodiments.

FIG. 14 is a signal flow diagram illustrating yet another example of signaling between an electronic device and external electronic devices according to various embodiments.

Referring to FIG. 14, in process 1407, an external electronic device 1403 (e.g., the electronic device 102 or 104 of FIG. 1 or the electronic device 200 of FIG. 2) may receive and output content from a server 1401 (e.g., the server 108 of FIG. 1 or the server 300 of FIG. 3). For example, the external electronic device 1403 may receive and output at least one of music and an image or picture from the server 1401. According to an example embodiment, the server 1401 may be a server that controls (or manages) both services providing content and services providing language models. In process 1409, the external electronic device 1403 may transmit state information to an electronic device 1405 connected for communication with the external electronic device 1403 in response to output of the content. For example, the external electronic device 1403 may transmit state information, which includes at least one of information associated with a name of the external electronic device 1403, information associated with an operation state of the external electronic device 1403, information associated with content provided by the external electronic device 1403, and information about a point in time when a user input is finally received, to the electronic device 1405. In process 1411, the electronic device 1405 may display a user interface including a virtual keyboard. For example, the electronic device 1405 may display a user interface including a virtual keyboard in response to execution of an application (e.g., a message application, an SNS application, or an intelligent application) providing (or supporting) the virtual keyboard. In process 1413, the electronic device 1405 may transmit a signal for requesting the language model corresponding to the state information of the external electronic device 1403 to the external electronic device 1403 in response to the user interface including the virtual keyboard being displayed. For example, the electronic device 1405 may transmit a signal for requesting at least one of the language model corresponding to the name of the external electronic device 1403, the language model corresponding to the operation state of the external electronic device 1403, and the language model corresponding to the content provided by the external electronic device 1403 to the external electronic device 1403. In process 1415, the external electronic device 1403 may identify the language model corresponding to the state information of the external electronic device 1403 among the language models of the external electronic device 1403 in response to reception of the signal for requesting the language model corresponding to the state information of the external electronic device 1403. In process 1417, the external electronic device 1403 may transmit the identified language model corresponding to the state information of the external electronic device 1403 to the electronic device 1405 in the case where the language model corresponding to the state information of the external electronic device 1403 is identified. In process 1419, the electronic device 1405 may provide a recommended word based on the language model of the electronic device 1405 and the language model corresponding to the state information of the external electronic device 1403. For example, in response to a string including one word being input through the virtual keyboard, the electronic device 1405 may determine at least one recommended word associated with the string based on the language model of the electronic device 1405 and the language model corresponding to the state information of the external electronic device 1403, and display the determined at least one recommended word in a recommended word display region of the user interface.

The above description has been made with reference to an illustrative example, in the case where the user interface including the virtual keyboard is displayed on the electronic device 1405 while (after) the external electronic device 1403 outputs the content, the recommended word is provided using the language model of the electronic device 1405 and the language model corresponding to the state information of the external electronic device 1403. However, according to various embodiments of the disclosure, even in a case where the content is output to the external electronic device 1403 after the user interface including the virtual keyboard is displayed on the electronic device 1405, the recommended word is provided using the language model of the electronic device 1405 and the language model corresponding to the state information of the external electronic device 1403. For example, in a case where the state information of the external electronic device 1403 is received from the external electronic device 1403 while the electronic device 1405 displays the user interface including the virtual keyboard, the electronic device 1405 may transmit the signal for requesting the language model corresponding to the state information of the external electronic device 1403 to the external electronic device 1403, and determine the recommended word based on the language model of the electronic device 1405 and the language model corresponding to the state information of the external electronic device 1403 if the language model corresponding to the state information of the external electronic device 1403 is received from the external electronic device 1403.

The method of recommending a word in an electronic device (e.g., the electronic device 101 of FIG. 1 or the electronic device 200 of FIG. 2) according to various example embodiments includes: displaying a user interface including a virtual keyboard; displaying a string including at least one word on the user interface based at least in part on an input to the virtual keyboard; determining at least one recommended word associated with the string based on a language model; and displaying the at least one recommended word on the user interface, wherein the language model includes a language model of the electronic device, and a language model received from a server or an external electronic device connected for communication with the electronic device based on state information of the external electronic device.

According to various example embodiments, the method of recommending a word may further include establishing connection for communication with the external electronic device, and receiving the state information of the external electronic device from the external electronic device.

According to various example embodiments, the method of recommending a word may further include transmitting a signal for requesting the language model corresponding to the state information of the external electronic device to the server or the external electronic device based on the received state information of the external electronic device, and receiving the language model corresponding to the state information of the external electronic device from the server or the external electronic device.

According to various example embodiments, the method of recommending a word may further include transmitting a signal for requesting the language model corresponding to the state information of the external electronic device to the server or the external electronic device in response to the user interface including the virtual keyboard being displayed, and receiving the language model corresponding to the state information of the external electronic device from the server or the external electronic device.

According to various example embodiments, the method of recommending a word may further include transmitting a signal for requesting the language model corresponding to the state information of the external electronic device to the server or the external electronic device in response to the state information of the external electronic device being received from the external electronic device, and receiving the language model corresponding to the state information of the external electronic device from the server or the external electronic device.

According to various example embodiments, the state information of the external electronic device may include at least one of information associated with a name of the external electronic device, information associated with an operation state of the external electronic device, information associated with content provided by the external electronic device, and information about a point in time when a user input is finally received.

According to various example embodiments, the method of recommending a word may further include, in a case where a plurality of pieces of state information are received from the plurality of external electronic devices in a state in which connection for communication between the electronic device and the plurality of external electronic devices is established, determining the external electronic device of the plurality of external electronic devices based at least in part on the information about a point in time when the user input is finally received which is included in the state information, transmitting a signal for requesting the state information of the external electronic device to the server or the external electronic device, and receiving the language model corresponding to the state information of the single external electronic device from the server or the external electronic device.

According to various example embodiments, the method of recommending a word may further include, in a case where signals including a plurality of pieces of state information are received from the plurality of external electronic devices through the communication circuit in a state in which connection for communication between the electronic device and the plurality of external electronic devices is established, determining the external electronic device of the plurality of external electronic devices based at least in part on intensities of the signals of the plurality of external electronic devices, transmitting a signal for requesting the state information of the external electronic device to the server or the external electronic device, and receiving the language model corresponding to the state information of the external electronic device from the server or the external electronic device.

According to various example embodiments, determining at least one recommended word may include determining at least one first recommended word associated with the string based on the language model of the electronic device, and determining at least one second recommended word associated with the string based on the language model received from the external electronic device.

According to various example embodiments, determining at least one recommended word may include determining at least one recommended word associated with the string based on the language model of the electronic device and the language model received from the external electronic device.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic device comprising:
  a display;
  a communication circuit configured to perform communication with at least one of at least one external server and/or at least one external electronic device;
  a processor operatively connected to the display and the communication circuit; and
  a memory operatively connected to the processor,
  wherein, the memory stores instructions which, when executed, cause the processor to control the electronic device to:
  display a user interface including a virtual keyboard through the display;
  display a string including at least one word on the user interface based at least in part on an input to the virtual keyboard;
  determine at least one first recommended word associated with the string based on a language model of the electronic device and at least one second recommended word associated with the string based on a language model received from the external server or the external electronic device; and
  display the determined at least one first recommended word and at least one second recommended word on the user interface,
  wherein the language model received from the external server or the external electronic device is based on state information of the external electronic device connected for communication through the communication circuit, and the state information of the external electronic device includes information associated with content provided by the external electronic device,
  wherein the instructions, when executed, cause the processor to control the electronic device:

receive a user input for selecting any one of the at least one first recommended word and the at least one second recommended word;

impart a weight to the language model of the electronic device or the language model received from the external server or the external electronic device, based on the selected at least one first recommended word or at least one second recommended word;

when the weight of the language model of the electronic device is higher than the language model received from the external server or the external electronic device, display the at least one first recommended word in a greater number than the at least one second recommended word; and when the weight of the language model received from the external server or the external electronic device is higher than the language model of the electronic device, display the at least one second recommended word in a greater number than the at least one first recommended word, wherein sum of the number of the displayed at least one first recommended word and the number of the displayed at least one second recommended word is less than or equal to a predetermined number.

2. The electronic device of claim 1, wherein the instructions, when executed, cause the processor to control the electronic device to:

establish the connection for communication with the external electronic device through the communication circuit; and receive the state information of the external electronic device from the external electronic device through the communication circuit.

3. The electronic device of claim 2, wherein the instructions, when executed, cause the processor to control the electronic device to:

transmit a signal requesting the language model corresponding to the state information of the external electronic device from the external server or the external electronic device through the communication circuit based at least in part on the received state information of the external electronic device; and receive the language model corresponding to the state information of the external electronic device from the external server or the external electronic device through the communication circuit.

4. The electronic device of claim 3, wherein the instructions, when executed, cause the processor to control the electronic device to:

transmit a signal requesting the language model corresponding to the state information of the external electronic device from the external server or the external electronic device through the communication circuit in response to the user interface including the virtual keyboard being displayed; and receive the language model corresponding to the state information of the external electronic device from the external server or the external electronic device through the communication circuit.

5. The electronic device of claim 3, wherein the instructions, when executed, cause the processor to control the electronic device to:

transmit a signal requesting the language model corresponding to the state information of the external electronic device from the external server or the external electronic device through the communication circuit in response to the state information of the external electronic device being received from the external electronic device; and receive the language model corresponding to the state information of the external electronic device from the external server or the external electronic device through the communication circuit.

6. The electronic device of claim 1, wherein the at least one external electronic device includes a plurality of external electronic devices, and wherein the instructions, when executed, cause the processor to control the electronic device to:

in a state in which the connection for communication between the electronic device and a plurality of external electronic devices is established, receive a signal including the state information from each of the plurality of external electronic devices through the communication circuit, determine at least one first external electronic device among the plurality of external electronic devices based at least in part on an intensity of the signal;

transmit a signal requesting the state information of the first external electronic device from the external server or the first external electronic device through the communication circuit; and receive a language model corresponding to the state information of the first external electronic device from the external server or the first external electronic device through the communication circuit.

7. A method of recommending a word in an electronic device, the method comprising:

displaying a user interface including a virtual keyboard;

displaying a string including at least one word on the user interface based at least in part on an input to the virtual keyboard;

determining at least one first recommended word associated with the string based on a language model of the electronic device and at least one second recommended word associated with the string based on a language model received from an external server or an external electronic device; and displaying the at least one first recommended word and the at least one second recommended word on the user interface, wherein the language model received from the external server or the external electronic device connected for communication with the electronic device is based on state information of the external electronic device connected for communication through a communication circuit of the electronic device, and the state information of the external electronic device includes information associated with content provided by the external electronic device, wherein the method further comprising:

receiving a user input for selecting any one of the at least one first recommended word and the at least one second recommended word;

imparting a weight to the language model of the electronic device or the language model received from the external server or the external electronic device, based on the selected at least one first recommended word or at least one second recommended word;

when the weight of the language model of the electronic device is higher than the language model received from the external server or the external electronic device, displaying the at least one first recommended word in a greater number than the at least one second recommended word; and when the weight of the language model received from the external server or the external electronic device is higher than the language model of the electronic device, displaying the at least one second recommended word in a greater number than the at least one first recommended word, wherein sum of the number of the displayed at least one first recommended word and the number of the displayed at least one second recommended word is less than or equal to a predetermined number.

8. The method of claim 7, further comprising:

establishing a communication connection with the external electronic device; and receiving the state information of the external electronic device from the external electronic device.

9. The method of claim 8, further comprising:

transmitting a signal requesting the language model corresponding to the state information of the external electronic device from the external server or the external electronic device based on the received state information of the external electronic device; and receiving the language model corresponding to the state information of the external electronic device from the external server or the external electronic device.

10. The method of claim 9, further comprising:

transmitting a signal requesting the language model corresponding to the state information of the external electronic device from the external server or the external electronic device in response to the user interface including the virtual keyboard being displayed; and receiving the language model corresponding to the state information of the external electronic device from the external server or the external electronic device.

11. The method of claim 9, further comprising:

transmitting a signal requesting the language model corresponding to the state information of the external electronic device from the external server or the external electronic device in response to the state information of the external electronic device being received from the external electronic device; and receiving the language model corresponding to the state information of the external electronic device from the external server or the external electronic device.

12. The method of claim 7, wherein the external electronic device includes a plurality of external electronic devices, and wherein the method further comprises: in a case where a signal including the state information is received from each of the plurality of external electronic devices through the communication circuit in a state in which connection for communication between the electronic device and the plurality of external electronic devices is established, determining at least one first external electronic device among the plurality of external electronic devices based at least in part on an intensity of the signal;

transmitting a signal requesting the state information of the first external electronic device from the external server or the first external electronic device; and receiving the language model corresponding to the state information of the first single external electronic device from the external server or the first external electronic device.

\* \* \* \* \*